(12) United States Patent
Baker et al.

(10) Patent No.: US 6,704,156 B1
(45) Date of Patent: Mar. 9, 2004

(54) SELF-WRITING OF SERVO PATTERNS IN A DISK DRIVE USING A PRINTED REFERENCE PATTERN

(75) Inventors: Bill Baker, Redwood City, CA (US); Michael Mayo, Palo Alto, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/494,826

(22) Filed: Jan. 31, 2000

(51) Int. Cl.$^7$ ............................................... G11B 21/02
(52) U.S. Cl. .......................................................... 360/75
(58) Field of Search ............................. 360/75, 15, 16, 360/17, 77.02, 77.05, 77.08

(56) References Cited

U.S. PATENT DOCUMENTS

| | | | |
|---|---|---|---|
| 4,188,646 A | | 2/1980 | Sordello et al. |
| 4,764,914 A | * | 8/1988 | Estes et al. ............... 369/53.14 |
| 5,012,363 A | * | 4/1991 | Mine et al. ............... 360/77.05 |
| 5,121,258 A | * | 6/1992 | Chi et al. .................... 360/17 |
| 5,570,247 A | * | 10/1996 | Brown et al. .................. 360/75 |
| 5,661,760 A | | 8/1997 | Patapoutian et al. |
| 5,668,679 A | | 9/1997 | Swearingen et al. .......... 360/75 |
| 5,771,130 A | | 6/1998 | Baker |
| 5,784,296 A | | 7/1998 | Baker et al. |
| 6,212,023 B1 | * | 4/2001 | Bonyhard .................... 360/15 |
| 6,304,407 B1 | * | 10/2001 | Baker et al. .................. 360/75 |

OTHER PUBLICATIONS

Ono, Kiroyuki; "Architecture and Performance of the ESPER–2 Hard–Disk Drive Servo writter"; *IBM J. Res. Develop.*; vol. 37; No. 1; Jan. 1993.

Baker, Bill R. et al.; "Servotrackwriter with Improved Positioning System"; Col. 33; No. 5; Sep. 1997; pp. 2623–25, IEEE Trans. On Magnetics.

* cited by examiner

*Primary Examiner*—David Hudspeth
*Assistant Examiner*—Fred F. Tzeng

(57) ABSTRACT

A method for self-servo writing a disk drive includes the steps of transferring a servo reference pattern by magnetic printing onto at least one storage surface of a disk; assembling the disk drive including installing the disk into the disk drive and enclosing the disk and the data transducers within a housing sealed against particulate contamination from an eternal ambient environment; reading the servo reference pattern from the disk via transducer heads; using head position and timing information in the pattern to precisely position and maintain the data transducers at concentric track locations of disk storage surfaces; and self-writing disk drive servo patterns onto the storage surfaces at the concentric track locations with the data transducers in accordance with the disk drive servo pattern features. In one example, the reference pattern includes servo clock information providing transducer head circumferential relative position information, and a servo position information pattern having coarse position information for providing transducer head coarse radial relative position information, and fine position information for providing transducer head fine radial relative position information. The printed reference pattern features have a resolution lower than a disk drive servo pattern features proportional to head gap widths of data transducer heads included in the disk drive.

54 Claims, 12 Drawing Sheets

Spatial coordinates

Downtrack direction, Time or Angle ⟶

SELF-WRITING OF SERVO PATTERNS IN A DISK DRIVE USING A PRINTED REFERENCE PATTERN

FIELD OF THE INVENTION

The present invention relates generally to a method for writing servo sector patterns on a data disk storage device, and more particularly, to self-servo writing of servo sector servo patterns on a data disk storage device using a reference pattern on a surface of a data disk.

BACKGROUND OF THE INVENTION

In many processing and computing systems, magnetic data storage devices, such as disk drives are utilized for storing data. A typical disk drive includes a spindle motor having a rotor for rotating one or more data disks having data storage surfaces, and an actuator for moving a head carrier arm that supports transducer (read/write) heads, radially across the data disks to write data to or read data from concentric data tracks on the data disks.

In general, a magnetic transducer head is positioned very close to each data storage surface by a slider suspended upon an air bearing. Typical clearance between a smooth disk surface and the slider is about one microinch, or less. The close proximity of the head to the disk surface allows recording of very high resolution data and servo patterns on the disk surface. Servo patterns are typically written with uniform angular spacing of servo sectors and interleaved data sectors or blocks. An example servo pattern includes circumferentially sequential, radially staggered single frequency bursts. Servo patterns provide the disk drive with head position information to enable the actuator, such as a rotary voice coil positioner, to move the head from starting tracks to destination tracks during random access track seeking operations. Further, the servo patterns provide the disk drive with head position information to enable the actuator to position and maintain the head in proper alignment with a track centerline during track following operations when user data is written to or read from the available data block storage areas in concentric data tracks on the disk surface.

Data transducer heads currently in use employ dual elements. An inductive write element having a relatively wide recording gap is used to write information into the data tracks, and a read element such as a "giant-magneto-resistive sensor" having a relatively narrow playback gap is used to read information from the data tracks. With this arrangement, data track densities equaling and exceeding e.g. 30,000 tracks per inch are possible.

Conventionally, servo patterns are written into the servo sectors of each disk using a servo writer at a point in the drive assembly process before the hard disk unit is sealed against particulate contamination from the ambient. A servo writer is a complex and expensive manufacturing unit, typically stabilized on a large granite base to minimize unwanted vibration and employing e.g. laser interferometry for precise position measurements. The servo writer typically requires direct mechanical access to the head arm, and includes a fixed head for writing a clock track onto a disk surface.

Because of the need for direct access to the interior of the hard disk assembly of each disk drive unit, the servo writer is typically located within a "clean room" where air is purged of impurities that might otherwise interfere with operation including the servo writing process or in normal usage after manufacturing. Further, such conventional servo-writing methods are very time consuming. In one example, a disk drive having two disks with four data storage surfaces can require three servo-writer-controlled passes of the transducer head over a single track during servo writing, consuming a total servo writing time as long as 13.2 minutes. Thus, servo writing using servo writers in clean rooms requires both considerable capital investment in the manufacturing process and severe time penalties in the manufacturing process attributable to servo writer bottlenecks. Further, as track densities increase with evolving hard disk designs, servo writers become obsolete, and have to be replaced, or upgraded, at considerable capital expense.

An attempt to alleviate the above shortcomings is directed to servo writing a master pattern at full resolution on one surface of a master disk during a pre-assembly operation. Then, a master disk with the master pattern is assembled with other blank disks into a disk drive unit. After the disk drive unit is sealed against the ambient, the master servo pattern of the master disk is used as a reference by the disk unit in self-writing embedded sector servo patterns on each data surface within the enclosed unit. Finally, the master pattern is erased, leaving the disk drive unit with properly located embedded servo sector patterns on every surface, including the surface which originally included the master pattern. An example of this servo writing method is described in U.S. Pat. No. 5,012,363 to Mine et al, entitled: "Servo Pattern Writing Method for a Disk Storage Device". However, a disadvantage of such a method is that certain repeatable run out information must be removed during the self-servo write operation. Another disadvantage of such a method is that a number of expensive servo writers are still required to write the master patterns on the master disks.

A self-servo writing method which eliminates the need for such servo-writers is described in commonly assigned U.S. Pat. No. 5,668,679 to Swearingen et al., entitled: "System for Self-Servo writing a Disk Drive", the disclosure thereof being incorporated herein by reference. That method essentially comprises the steps of writing a clock track at an outside diameter (OD) recording region of a first disk surface of a disk drive having multiple storage surfaces, tuning an open-loop seek from the OD to an inside diameter (ID) recording region to develop a repeatable seek profile, and recording a plurality of high frequency spiral tracks from the OD to the ID, each spiral track including embedded (e.g. missing bit) timing information. Then, spiral track provided peak data, and missing bit data, are read back. A voltage controlled oscillator is locked to the timing information to track disk angular position. As the head is then moved radially from OD to ID the detected spiral peaks shift in time relative to a starting (index) mark, although the timing information does not shift. Embedded servo sectors can then be precisely written across the data storage surface by multiplexing between reading spirals and writing servo sectors (wedges). After the integrity of the wedges has been verified, the spirals are erased (overwritten with user data). While this method is satisfactory, challenges remain in generating and recording an accurate clock pattern on the first disk surface. Further, the time period required to produce the master position pattern on the first disk surface can be lengthy.

There is, therefore, a need for an improved self-servo writing method in disk drives which reduces self-servo writing times, is simpler to implement and does not require servo-writers.

BRIEF SUMMARY OF THE INVENTION

The present invention satisfies these needs. In one aspect, the present invention provides a method for self-servo writing a disk drive by transferring a servo reference pattern onto at least one storage surface of a disk. The servo reference pattern is transferred onto the storage surface by magnetic printing, wherein a resulting printed reference pattern comprises servo clock information providing transducer head circumferential relative position information, and servo position information. The servo position information includes coarse position information for providing transducer head coarse radial relative position information, and fine position information for providing transducer head fine radial relative position information. The printed reference pattern has a resolution lower than that of a disk drive servo pattern features proportional to head gap widths of data transducer heads included in the disk drive. The disk drive is assembled, including installing the disk into the disk drive and enclosing the disk and the data transducers within a housing.

Thereafter, in a self servo writing process, the printed reference pattern is read from the disk via transducer heads, and the read servo clock and the servo position information are used to precisely position and maintain the data transducers at concentric track locations of disk storage surfaces of one or more disks. Servo patterns are self-written onto the storage surfaces at the concentric track locations with the data transducers in accordance to said disk drive final servo pattern features.

In one example, the clock information comprises a pattern of one or more substantially radial timing segments, and the servo position information comprises slanted segments, such that sets of one or more timing segments are separated by the slanted segments. In one case, the slanted segments between the timing segments include periodically suppressed slanted segments, wherein the coarse position information comprises the periodically suppressed slanted segments, and the fine position information comprises the unsuppressed slanted segments. As such, the fine position information comprises a fine pattern of slanted segments, the coarse position information comprises a coarse pattern of slanted segments, the coarse pattern of slanted segments being interspersed with the fine pattern of slanted segment, and sets of one or more timing segments are separated by said interspersed coarse and fine patterns of slanted segments.

In another case, the servo position information comprises slanted segments, such that sets of one or more timing segments are separated by the slanted segments, wherein the slanted segments between the timing segments are organized into at least two circumferentially adjacent sets of transverse slanted segments. The slanted segments between timing segments include periodically suppressed slanted segments and wherein the coarse position information comprises the periodically suppressed slanted segments, and the fine position information comprises the unsuppressed slanted segments.

In self servo-writing the disk drive, the coarse position information can be used to measure a dominant component of eccentricity of the printed reference pattern. Further, the fine position information in conjunction with the clock information and the coarse position information of the printed reference pattern can be used to precisely position and maintain the data transducers at concentric data tracks.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

In one embodiment, the present invention provides servo reference patterns and a method of self-servo writing in disk drives using the servo reference patterns. The servo reference patterns are printed on a reference disk by magnetic printing, and comprise magnetic segments having magnetic transitions wherein the direction of magnetization is generally along the circumferential direction of circular disk tracks. Spatial separation between proximately printed segments can be used to position transducer heads over concentric circular disk tracks for self-servo-writing of servo patterns after disk drive assembly.

Figure 1:
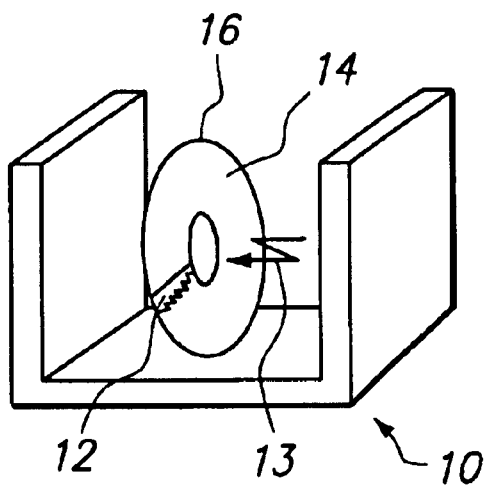
FIG. 1 shows a highly diagrammatic representation of an embodiment of a magnetic printing station for printing a reference disk storage surface with a servo reference pattern.

Accordingly, a magnetic printing station 10, shown diagrammatically in FIG. 1 magnetically prints or otherwise transfers a servo reference pattern 12 to one surface 14 of a magnetic disk 16, known as a reference disk. The magnetic printing station 10 can utilize one of several known magnetic transfer methods. One such method includes the steps of applying a unidirectional magnetic domain orientation to a blank storage disk, such as the surface 14 of the disk 16. Then, a reticle or magnetic die having the desired magnetic reference pattern is placed into close proximity with the storage surface 14 of the disk 16, and the disk 16 is heated to approach the Curie temperature of the storage media on the surface 14. The reference surface 14 is selectively remagnetized with the aid of a reverse bias field and e.g. localized heating in accordance with the reference pattern established by the reticle or die. In cases wherein an optical reticle is used, intense local heating through reticle apertures can be obtained from a laser beam, for example, in accordance with well understood magneto-optical principles in order to provide selective magnetization of domains of the reference-patterned surface 14 in accordance with the servo reference pattern 12. Care must be taken during the magnetic printing process not to damage or contaminate the disk 16. Preferably, although not necessarily, the magnetic printing process is carried out in a very clean environment within a disk manufacturing process.

Figure 2A:
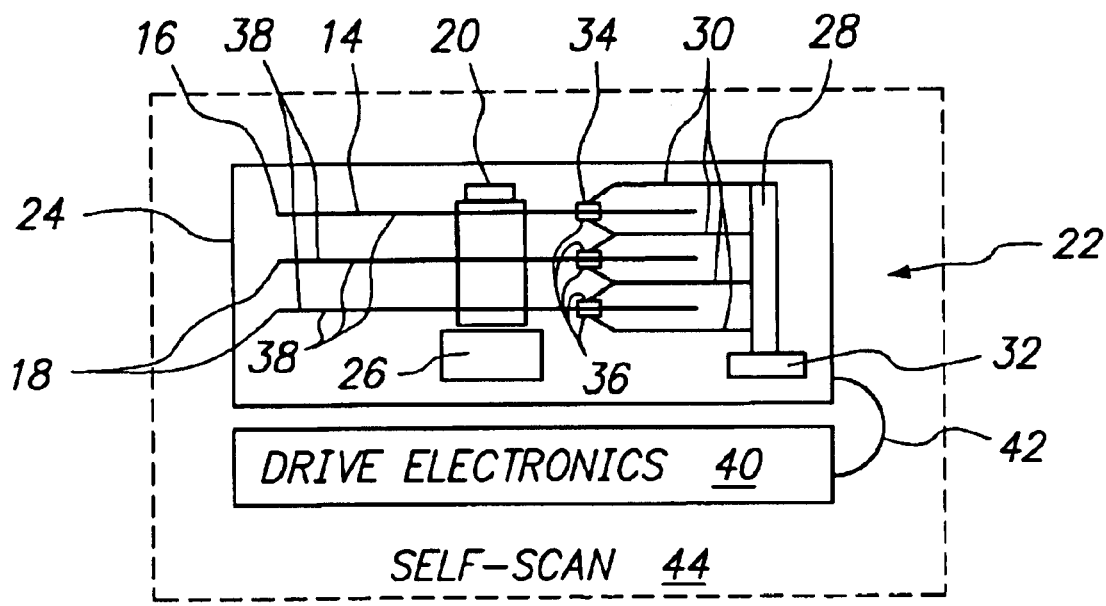
FIG. 2a shows a diagrammatic view of an embodiment of a hard disk drive comprising a head-disk assembly including a reference-patterned disk and several blank disks, and disk drive electronics, for self-servo-writing based on the reference pattern within a self-scan station within a manufacturing process.

Referring to FIG. 2, after the servo reference pattern 12 has been applied to storage surface 14 of the printed disk 16, the disk 16, along with other blank disks 18 are assembled onto a spindle 20 of a disk drive 22. The spindle 20 is mounted within an enclosed head-disk assembly (HDA) 24, and is rotated at a predetermined angular velocity by a spindle motor 26. A comb-like head actuator structure 28 is included with the HDA 24, wherein the head actuator structure 28 includes head arms 30 rotated by e.g. a rotary voice coil motor 32 in order to position transducer heads 34 and 36, respectively, adjacent to the reference surface 14 of the disk 16 and blank surfaces 38 of the disks 16 and 18. After the disks 16, 18 and heads 34, 36 are installed, the HDA 24 is enclosed by a cover to prevent unwanted particulate contamination. A drive electronics module 40, such as a printed circuit board carrying large scale integrated circuits and other components, is mechanically attached to the HDA 24 and electrically connected thereto by a suitable interconnection 42, in order to complete the assembly of the disk drive 22. The disk drive 22 is then placed into a self-scan chamber 44 and connected to a suitable power supply, wherein a control and status collection computer (not shown) collects data concerning the disk drive 22 during self-scan procedures.

In one version of the present invention, a special program in the drive electronics 40 (e.g., downloaded from the status collection computer) enables the head 34 to read the reference pattern 12, and in turn enables each head 36 to write precise servo patterns on each storage surface 38 including the reference surface 14 in accordance with a final servo pattern features plan (e.g., servo plan pattern 39 shown in FIG. 12 and described further below). After all of the surfaces 38 of the disks 18 have been written with final servo patterns, the reference pattern 12 is overwritten, either in the self-scan station 44, or later with user data when the disk drive 22 is installed in a user computing environment for data storage and retrieval operations.

Figure 2B:
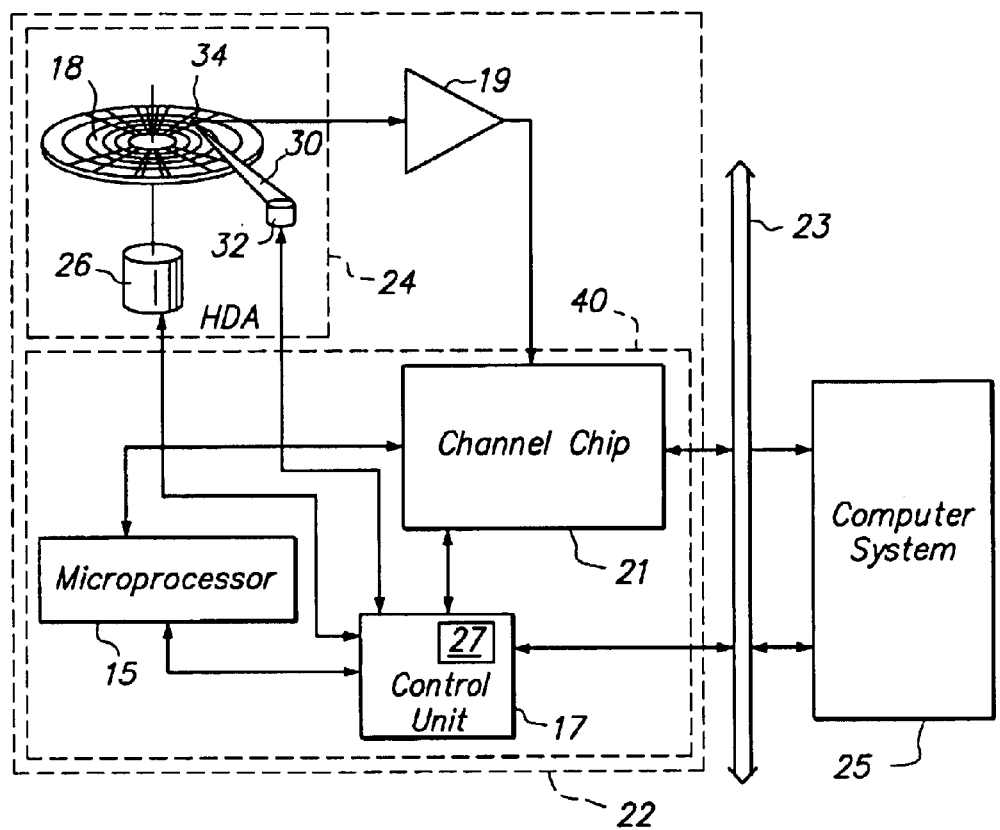
FIG. 2b shows a simplified diagram of the hard disk drive of FIG. 2a, including details of an embodiment of the drive electronics therein.

Referring to FIG. 2b, the disk drive 22 is shown connected to a computer system 25 via a bus 23. In one example, the computer system 25 can comprise the aforementioned status collection computer. The disk drive 22 includes the HDA 24 and the drive electronics 40. The HDA 24 comprises the spindle motor 26 for rotating at least one magnetic storage disk 18, and the actuator assembly 30 having the actuator motor 32 for positioning the transducer assembly 34/36 to read and write data from and to, respectively, the data storage disk 16,18. The drive electronics 40 includes a microprocessor 15 typically concerned with servo control of the disk drive 22, a control unit or controller 17, including a control processor 27, primarily controlling data flow communications with the computer system 25 via a system bus 23 and also controlling components of the disk drive 22, a preamplifier 19 amplifying signals read by the transducer assembly 34, and a channel chip 21 for processing data being transferred between the preamplifier 19, the computer system 25, the microprocessor 15 and the control unit 17.

Figure 2C:
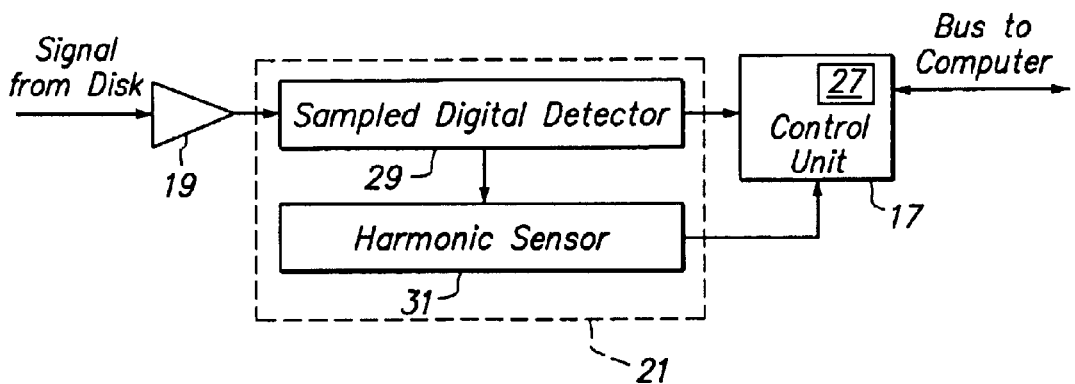
FIG. 2c shows a simplified block diagram of details of an embodiment of the channel chip in the drive electronics of FIG. 2b.

A simplified version of the channel chip 21 is shown in FIG. 2c. As shown, the channel chip 21 receives an amplified signal from the preamplifier 19. The channel chip 21 includes a sampling digital detector 29 coupled to the preamplifier 19 for digitally sampling the signal read from the disk 18. The sampling digital detector 29 employed in the channel chip 21 can be constructed to operate as any form of digital detector such as, for example, a Viterbi detector, a DFE (decision feedback equalizer), a PR4 (partial response mode 4), EPR4 (extended partial response mode 4), or other known digital detectors. A harmonic sensor 31 is coupled to receive digital samples from the sampling digital detector 29. The harmonic sensor 31 processes the digital samples to provide measurements used to calculate the spectral content of the read signal. The channel chip 21 provides the harmonic sensor 31 measurements to the microprocessor 15 via the control unit 17. The microprocessor 15 can be a conventional integrated circuit processor chip which has the capability of performing floating point arithmetic, integer mathematics, transforms, etc. Details of an example disk drive electronics including the above components is described in U.S. Pat. No. 5,784,296, incorporated herein by reference.

Figure 3:
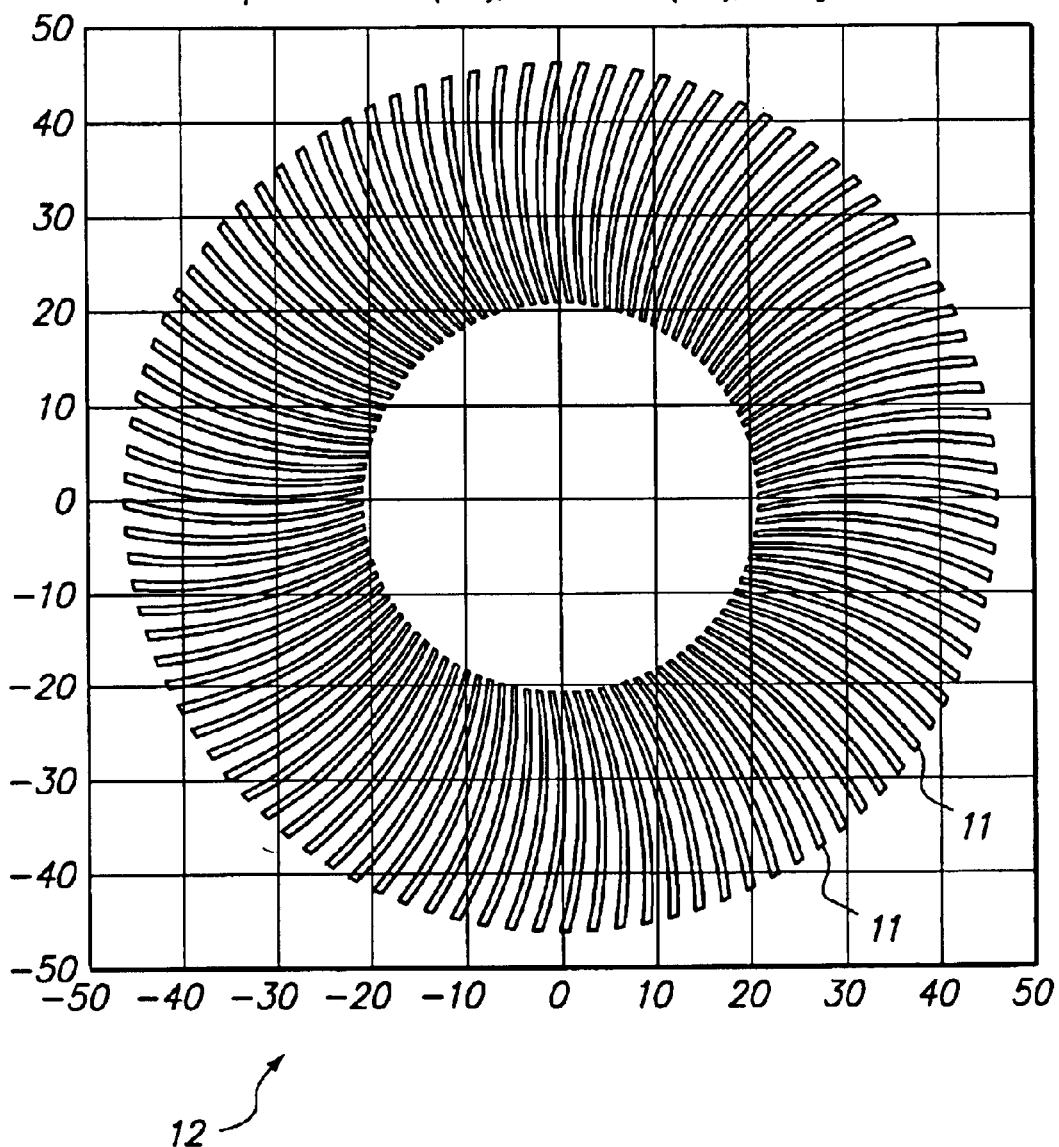
FIG. 3 shows a diagrammatic plan view of a view of an embodiment of a servo reference pattern in accordance with aspects of the present invention transferred to a disk surface by the printing station of FIG. 1.

Referring to FIG. 3, a schematic example of the printed reference pattern 12 is shown. Magnetic printing is most effectively accomplished by magnetizing relatively long circumferentially magnetized regions or strips with the long dimension generally in the radial direction of the disk 16. Successive strips in the circumferential direction are magnetized in opposite/transverse directions creating transitions. Fringing fields from these transitions provide a signal recovered during a read operation according to well known methods. The transitions at the long edges are relatively straight and can be read by a passing head 34 with less noise than the area near the end of the strips. The long edge transitions are generally transversely aligned to the travel path of the head 34 about a locus of a circumferential track. FIG. 3 illustrates an example printed reference pattern 12 comprising one hundred spokes 11, each spoke 11 including servo clock information for providing relative circumferential position information for the head 34, and radial position information for the head 34. The reference pattern 12 is shown in vertical/horizontal scale and is about 95 mm in diameter. Other features and diameters for the reference pattern 12 are possible based on the diameter of the disk 16.

Figure 4A:
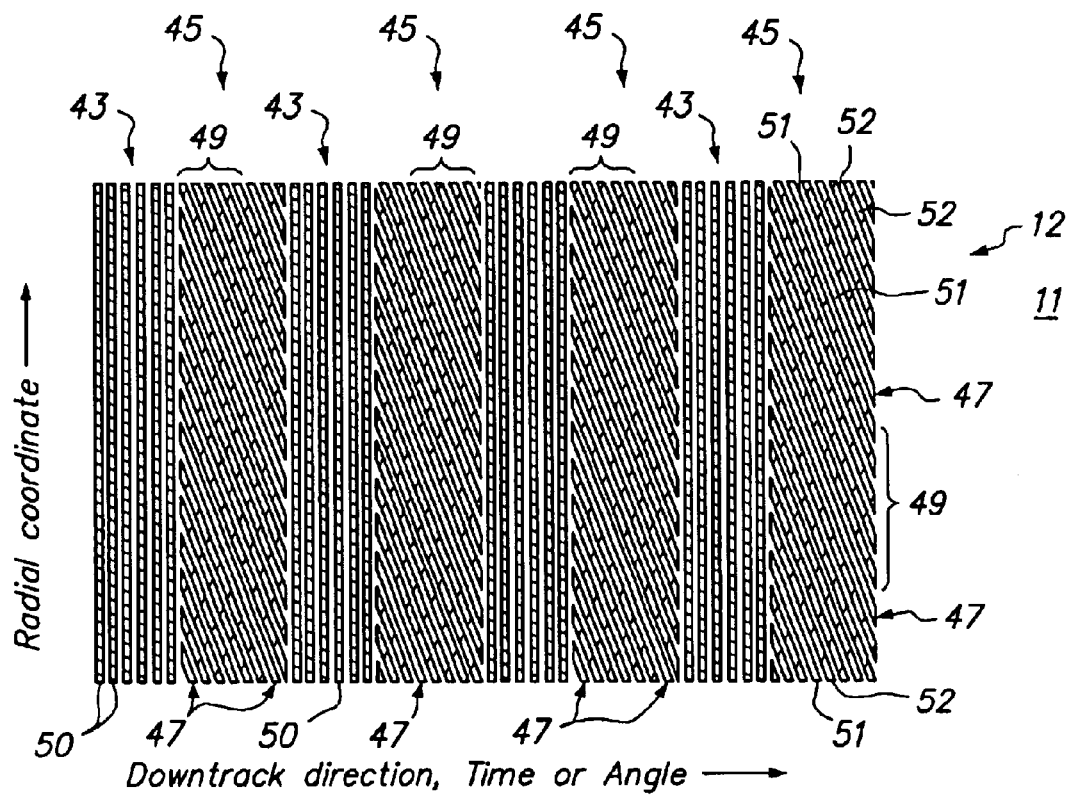
FIGS. 4A–B show enlarged schematic plan views of a portion of example reference patterns comprising servo clock information and servo position information printed onto the reference-patterned disk at the printing station of FIG. 1.

FIG. 4A shows an enlarged schematic plan view of a section of an example spoke 11 (FIG. 3) including an embodiment of the servo clock information 43 and an embodiment of the servo position information 45. The servo clock information 43 includes a pattern of substantially radial isochronal timing segments 50. The servo position information 45 includes coarse position information 47 for providing transducer head coarse radial relative position information, and fine position information 49 for providing transducer head fine radial relative position information.

In one example, the coarse position information 47 comprises a coarse pattern of radially spaced slanted segments 51, and the fine position information 49 comprises a fine pattern of radially spaced slanted segments 52. The coarse slanted segments 51 are interspersed with the fine slanted segments 52. Sets of one or more timing segments 50 are separated by interspersed slanted segments 51 and 52. By slanting the segments 51, 52 relative to the timing segments 50, a repeating reference pattern 12 that provides relative coarse and fine radial position information is obtained. In this example, the slanted segments 51, 52 between sets of one or more timing segments 50 are slanted in the same direction.

Figure 4B:
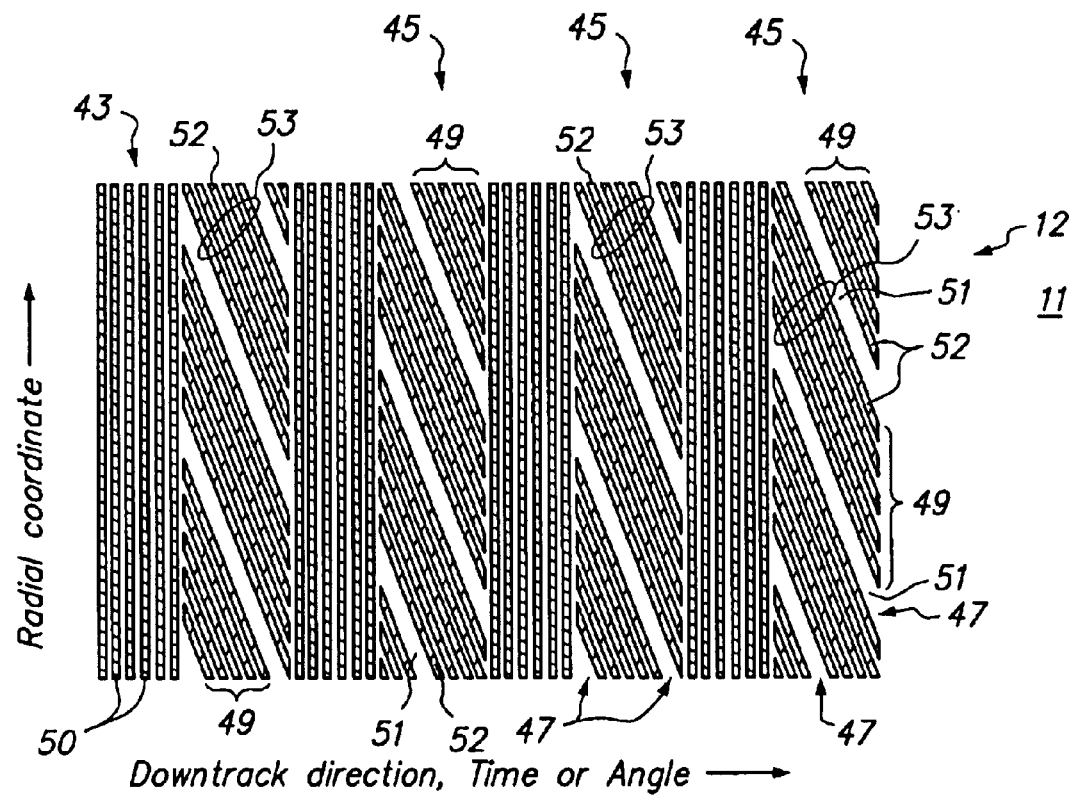

Referring to FIG. 4B, in another example, the coarse slanted segments 51 can comprise periodically suppressed slanted segments (shown as missing slanted segments) among the fine slanted segments 52. As such, the surface 14 of the disk 16 is printed with a repeating reference pattern 12 of substantially radial timing segments 50 separated by unsuppressed slanted segments 52 including periodically suppressed slanted segments 51. In one case, the slanted segments 51, 52 are sloped about 20 degrees in relation to the radial timing segments 50. Larger or smaller slopes can also be used.

Referring to FIGS. 4A–B, circumferentially adjacent slanted segments 51 can be radially displaced, such that a slanted segment 51 is radially partially-stepped relative to one or more other slanted segments 51. The slanted segments 51 are separated by slanted segments 49. Similarly, circumferentially adjacent sets 53 of slanted segments 52 can be radially displaced, wherein one set 53 of slanted segments 52 is radially partially-stepped relative to another set 53 of slanted segments 52. The sets 53 of slanted segments 52 are separated by slanted segments 49. The coarse slanted segments 51 can be of the same width as the fine slanted segments 52. Alternatively, the coarse slanted segments 51 can be of different width than the slanted fine segments 52.

Figure 5A:
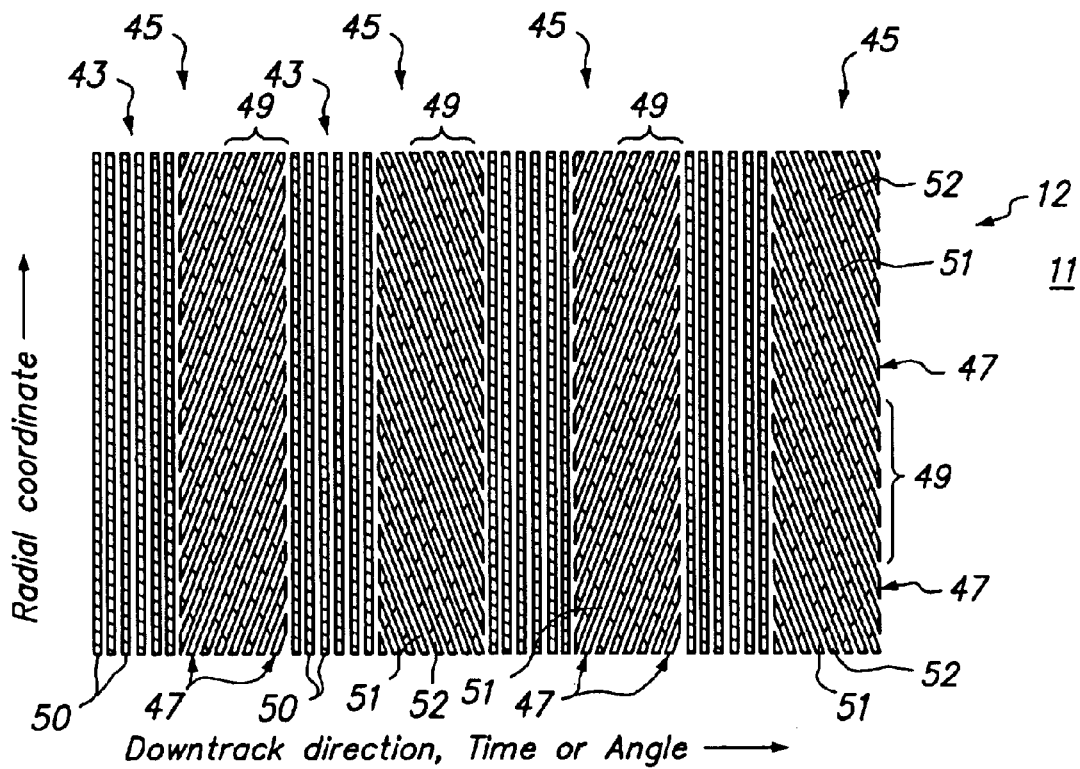
FIGS. 5A–B show enlarged schematic plan views of a portion of example reference patterns comprising servo clock information and servo position information with transverse patterns printed onto the reference-patterned disk at the printing station of FIG. 1.

FIG. 5A shows an enlarged schematic plan view of a section of another example spoke 11 including the servo clock information 43 described above, and another embodiment of the servo position information 45. The servo position information 45 includes coarse position information 47 for providing transducer head coarse radial relative position information, and fine position information 49 for providing transducer head fine radial relative position information.

In one example, the coarse position information 47 comprises a coarse pattern of radially spaced slanted segments 51, and the fine position information 49 comprises a fine pattern of radially spaced slanted segments 52. The coarse slanted segments 51 are interspersed with the fine slanted segments 52. Sets of one or more of the timing segments 50 are separated by interspersed slanted segments 51 and 52. By slanting the segments 51, 52 relative to the timing segments 50, a repeating reference pattern 12 that provides relative coarse and fine radial position information is obtained. In this example, the slanted segments 51, 52 between sequential sets of one or more timing segments 50 are at different or opposite angles relative to the direction of an iscoshrone at that location (e.g., transverse).

Figure 5B:
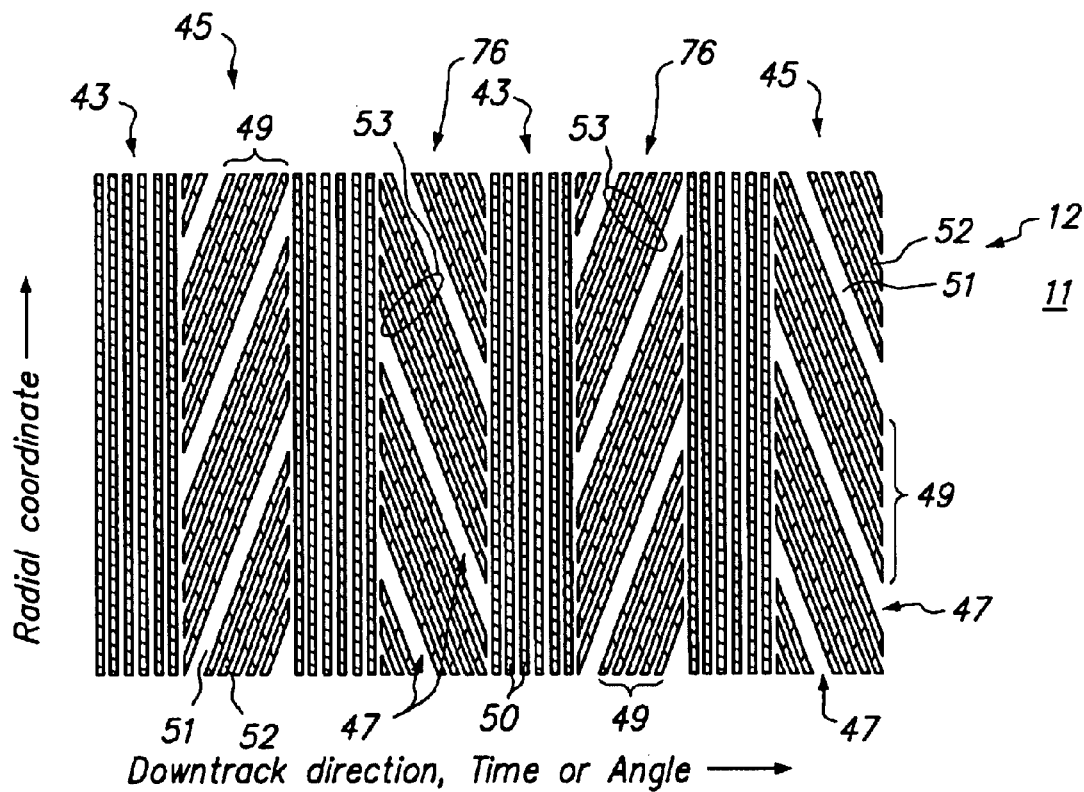

Referring to FIG. 5B, in another example, the coarse slanted segments 51 can comprise periodically suppressed slanted segments (shown as missing slanted segments) among the fine slanted segments 52. As such, the surface 14 of the disk 16 is printed with a repeating reference pattern 12 of substantially radial timing segments 50 separated by unsuppressed slanted segments 52 including periodically suppressed slanted segments 51. In this example, the slanted segments 51, 52 are sloped about 20 degrees in relation to the radial timing segments 50. Larger or smaller slopes can also be used.

Referring to FIGS. 5A–B, circumferentially adjacent slanted segments 51 can be radially displaced, such that a slanted segment 51 is radially partially-stepped relative to one or more other slanted segments 51. Similarly, circumferentially adjacent sets 53 of slanted segments 52 can be radially displaced, wherein one set 53 of slanted segments 52 is radially partially-stepped relative to another set 53 of slanted segments 52. The coarse slanted segments 51 can be of the same width as the fine slanted segments 52. Alternatively, the coarse slanted segments 51 can be of different width than the slanted fine segments 52.

Figure 6A:
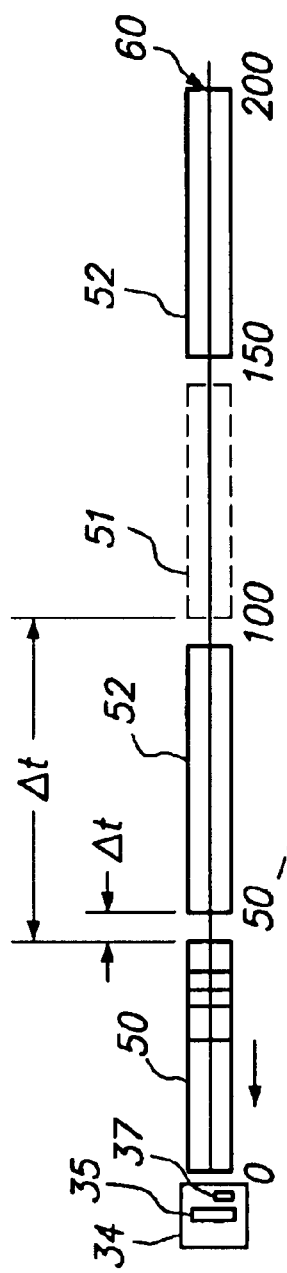
FIG. 6 is a set of graphs depicting a linearized portion of a radial reference segment of the reference pattern of FIG. 5, printed at the printing station of FIG. 1.

The fine slanted segments 52 are preferably printed as a series of magnetic flux reversal patterns at a constant flux pitch or reversal frequency. FIG. 6A depicts a circumferential track 60 across the reference pattern 12 passing under the head 34. In FIG. 6A, the head 34 is shown to include an inductive write element 35 and a magneto-resistive or giant magneto-resistive (GMR) read element 37 narrower than the write element 35. The head 34 passes by sets of timing segments 50, coarse (suppressed) segments 51 and fine slanted segments 52 as the track 60 moves past the head 34 during rotation of the reference disk 16 within the disk drive 22.

Relative radial position of the head 34 within a band defined by the extent of a slanted segment 52 (or suppressed segment 51) can be determined by measuring a differential time $\Delta t$ between passage of a group of one or more timing segments 50 by the head 34, and arrival of a group of one ore more slanted segments 52 (or suppressed segment 51) at the head 34. In one example, relative radial position of the head 34 within a band defined by the extent of a slanted segment 52 (or suppressed segment 51) can be determined by measuring a differential time between passage of a trailing edge 62 of the timing segment 50 by the head 34, and arrival of a leading edge 64 of the next slanted segment 52 (or suppressed segment 51) at the head 34 (shown as $\Delta t$ in FIG. 6A).

Figure 6B:
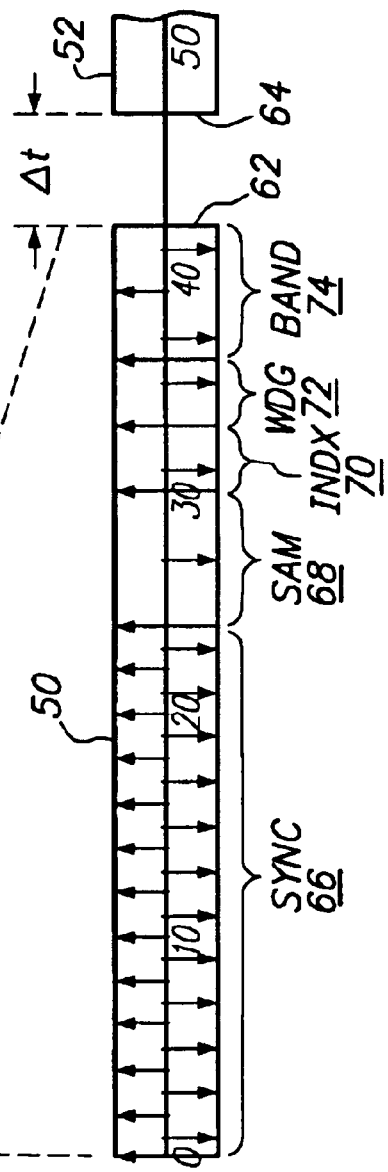
Figure 6C:

FIG. 6B expands an example segment 50 depicted in FIG. 6A in order to illustrate other timing and position information which may be transferred by magnetic printing process. This information can include a fixed-frequency synchronization pattern 66 of circumferential flux reversals, a servo address mark 68, an index flux reversal 70 present in a predetermined one of the timing segments 50 to mark track beginning of the reference pattern 12, a wedge count field 72 which identifies each particular one of the sets of timing and slanted segments, and a band count field 74 which identifies the particular radial band of the adjacent slanted segments, e.g. segment 52. FIG. 6C depicts an example reticle or die pattern suitable for printing the fields 66, 68, 70, 72, and 74 of each timing segment 50.

In the above description, the differential time Δt can be used to determine the radial position of the head 34 relative to the reference pattern 12. Generally, other methods including phase detection of the timing segments 50 and slanted segments 51, 52 can provide further accurate detection of the radial position of the head 34.

Figure 7:
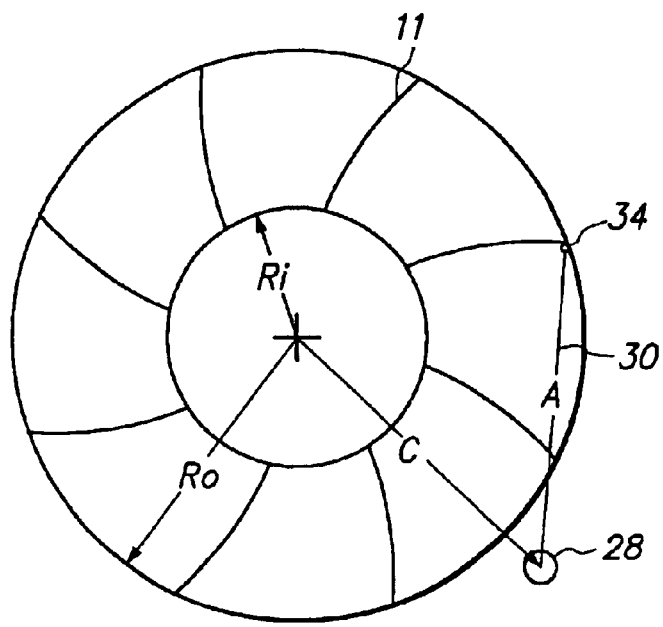
FIG. 7 illustrates spatial considerations and constraints of a printed reference pattern according to the present invention in relation to the architecture of the disk drive of FIG. 2.

FIG. 7 shows the generally arcuate radial path followed by the head 34 across the disk 16. The arc of the head 34 is a function of the length (A) of the head arm 30 and the distance (C) between the pivot point of the rotary actuator 28 and the rotational axis of the spindle 20 and the reference disk 16. The extent of arc is a function of the disk outer radius (Ro) and disk inner radius (Ri).

Because the reference pattern 12 is transferred by the printing station 10 to the surface 14 of the disk 16, the reference pattern 12 as printed may include a repeatable run-out (RRO) and/or timing non-uniformity (eccentricity) after the disk 16 is mounted on the spindle 20. The eccentricity can be large, corresponding to the radial shift of one or more fine slanted segments 52 under the head 34, and as such the coarse slanted segments 51 are utilized initially as coarse radial position information to determine large eccentricities of the pattern 12.

Figure 8:
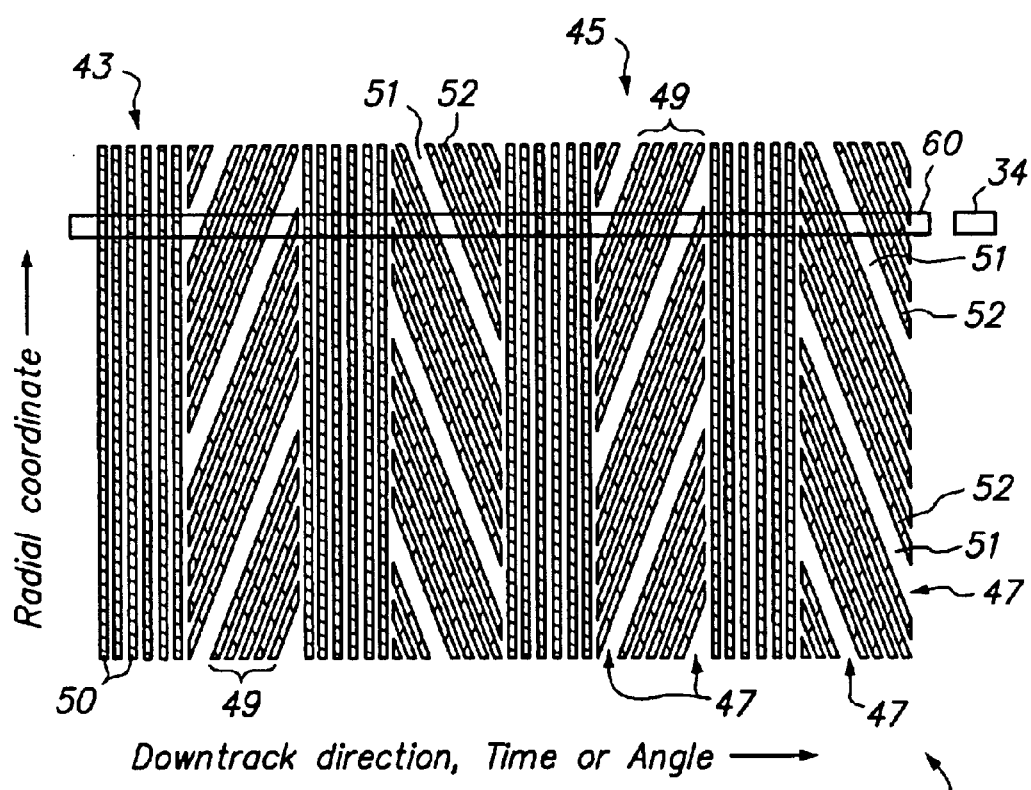
FIG. 8 shows use of a printed reference pattern to obtain a precisely located data track having a track resolution (density) much higher than the printed reference pattern in accordance with aspects of the present invention.

In one implementation, the actuator 28 moves the arm 30 to a crash stop at an outer diameter (or inner diameter) of the disk 16, to start measuring said eccentricity. At the crash stop, the actuator 28 is biased to urge the arm 30 against the crash stop to keep the head 34 in a stationary position relative to the crash stop. For example, referring to FIG. 8, as the disk 16 rotates, the reference pattern 12 passes under the head 34, defining a circumferential track 60 of the head 34 across the reference pattern 12. The head 34 moves substantially perpendicular relative to the timing segments 50, and substantially transverse relative to the slanted position segments 51, 52. As the reference pattern 12 passes under the 34, the eccentricity of the pattern 12 causes the slanted segments 51, 52 to shift radially in and out under the head 34. In particular, as the slanted segments 52 shift radially in an out under the head 34, the head 34 crosses the slanted segments 52 at different circumferential distances from the timing segments 50. Similarly, as the slanted segments 51 shift radially in an out under the head 34, the head 34 crosses the suppressed segments 51 at different circumferential distances from the timing segments 50. The changes in said circumferential distances provide timing variations to determine the change in radial displacement and therefore the eccentricity of the pattern 12.

In operation, when the disk 16 first starts rotating, the suppressed segments 51 are utilized to coarsely determine the radial position of the head 34 relative to the pattern 12. As the disk rotates under the head 34 at the crash stop, when a timing segment 50 passes under the head 34 a timer (e.g., in the disk electronics 40) is started, and then the timer is stopped when a suppressed segment 51 passes under the head 34 to measure an elapsed time Δt. As such, the elapsed time Δt between that timing segment 50 and a suppressed segment 51 passing under the head 34 at the crash stop is measured. For each particular radial position of the head 34 relative to the reference pattern 12, there is an expected (i.e. preselected) elapsed time between a timing segment 50 and a suppressed segment 51 passing under the head 34 if there is no eccentricity. The measured elapsed time is compared to the expected elapsed time at the crash stop to provide a coarse measure of radial shift in the reference pattern 12 under the head 34 at the crash stop relative to that timing segment 50. The process is repeated for each timing segment 50 to obtain coarse measurements of radial shift of slanted segments 51 in the reference pattern 12 for all the timing segments 50 in one revolution of the disk 16. Said coarse measurements of radial shift in the pattern 12 at the crash stop relative to each timing segment 50 is used during a servo-writing phase to position the heads 34 to account for large eccentricities and create concentric circles of final servo patterns.

At the crash stop the suppressed segments 51 are utilized to measure large radial shifts of the slanted segments 52 due to large eccentricities. The slanted segments 52 are utilized to measure fine radial shifts of the slanted segments 52. For example, if the eccentricity is such that at as the reference pattern 12 rotates under the head 34, the reference pattern 12 shifts radially whereby one or more slanted segments 52 shift radially under the head 34, then the slanted segments 52 do not provide enough information to radially differentiate one slanted segment 52 from another, to recognize the radial shift. This is because the elapsed time from the timing segments 50 to the slanted segments 52 before and after such a radial shift of one or more slanted segments 52 is the same. However, because of the sparser positioning of the suppressed segments 51 relative to the slanted segments 52, a radial shift under the head 34 of one or more slanted segments 52 can be recognized because the elapsed times from the timing segments 50 to the suppressed segments 51 before and after such a radial shift are different due to the slope of the suppressed segments 51. As such, the suppressed segments 51 allow measurement of the eccentricity even if the eccentricity is larger than the width of a slanted segment 52.

Therefore, the slanted segments 52 are used to provide a measure of the radial shift of the reference pattern 12 of less than one slanted segment 52 under the head 34, thereby providing fine radial shift information. As the disk rotates under the head 34 at the crash stop, when a timing segment passes 50 under the head 34 a timer is started, and then the timer is stopped when a slanted segment 52 passes under the head 34. As such, the elapsed time Δt between a timing segment 50 and a slanted segment 52 passing under the head 34 at the crash stop is measured. For each particular radial position of the head 34 relative to the reference pattern 12, there is an expected (i.e. preselected) elapsed time between a timing segment 50 and a slanted segment 52 to pass under the head 34 if there is no eccentricity. The measured elapsed time is compared to the expected elapsed time to provide a fine measure of radial shift in the slanted segments 52 of the pattern 12 under the head 34 at the crash stop relative to that timing segment 50. The fine measurement of radial shift in the pattern 12 at the crash stop relative to each timing segment 50 is performed for all the timing segments 50 per revolution of the disk 16.

Referring back to FIG. 3, the example reference pattern 12 comprises one-hundred spokes 11 separated by gaps. As described above, each spoke 11 includes a set of one or more timing segments 50 and servo position information 45 including sets of segments 51, 52, which pass under the head 34 per revolution of the disk 16. Measuring the radial shift in the slanted segments 51, 52 passing under the head 34 provides an indication of the eccentricity of the reference pattern 12 on the disk 16. To reduce the effect of noise on the measurements, the eccentricity can be measured for ten to a hundred revolutions of the disk 16 under the head 34 at the crash stop position, and the measurements are averaged to reduce noise.

The eccentricity information is then utilized in the servo-writing process to eliminate the eccentricity in writing the final servo pattern 39 on disks 18. Specifically, in the servo-writing phase, the coarse radial shift measurements are used in conjunction with the fine radial shift measurements per each timing segment 50 to steer the heads 36 to correct for the eccentricity at that timing segment 50 and generate concentric circular tracks on disks 18 when writing the final servo patterns. The coarse and fine radial shift measurements provide precise radial information relative to the timing segments 50 for accurately positioning the heads 36 to write the final concentric circles of servo patterns on the disks 18. The disk drive electronics 40 comprises digital processing circuits including the channel chip 21 (FIGS. 2b–c), and routines for executing e.g. a discrete Fourier transform (e.g., as described in U.S. Pat. No. 5,784,296, incorporated herein by reference) which can be used in an algorithm for correcting the RRO error from the reference disk pattern. For example, a technical paper by Hiroyuki Ono, titled "Architecture and Performance of the ESPER-2 Hard-Disk Drive Servo Writer", *IBM J. Res. Develop.* Vol. 37, No. 1, January 1993, pp. 3–11, describes a method of removing RRO in a disk drive servo writer.

Figure 9A:
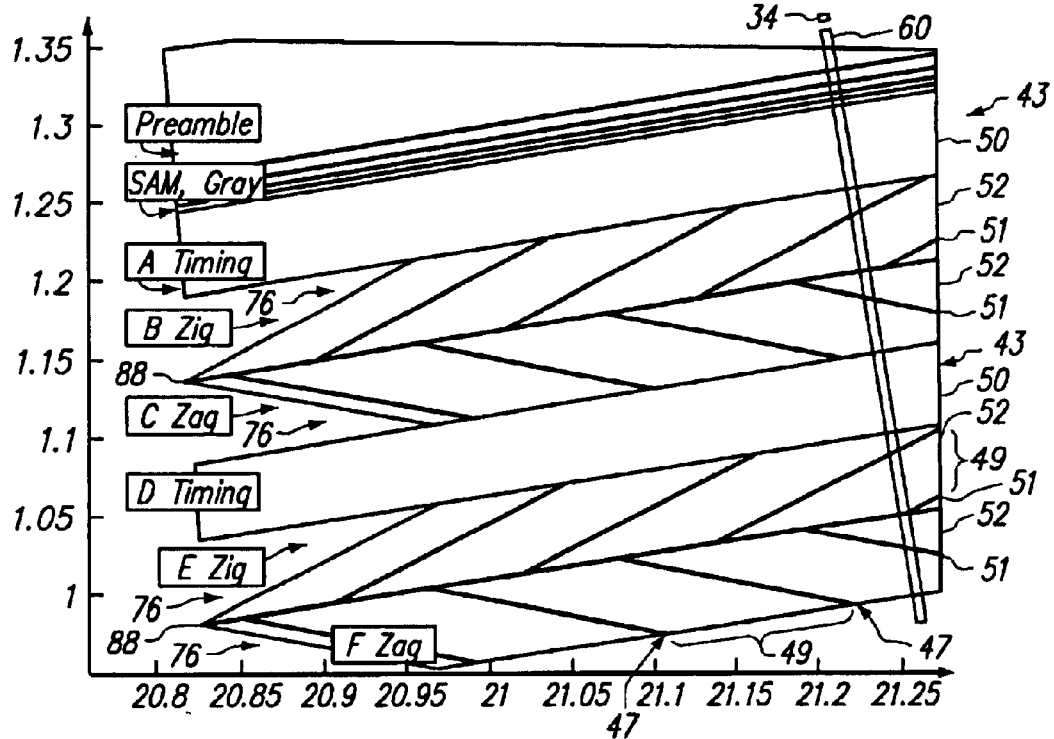
FIG. 9A shows a greatly enlarged portion of another example of the reference pattern of FIG. 3 printed onto the reference-patterned disk at the printing station of FIG. 1.

FIG. 9A shows a greatly enlarged portion at the inner radius of another example of a spoke 11 of the reference pattern 12 of FIG. 3 printed onto the reference-patterned disk 16 at the printing station of FIG. 1. In this example, the servo position information 45 comprises the fine position information 49 including slanted segments 52 and the coarse position information 47 including the slanted (suppressed) segments 51, organized into two circumferentially adjacent groups 76 of transverse slanted segments 51, 52 between sets of one or more timing segments 50. Each group 76 includes multiple slanted segments 52 spaced by multiple suppressed segments 51 (as also shown by example in FIG. 5B).

In FIG. 9A, the slanted segments 51, 52 in adjacent transverse groups 76 form a "Zig-Zag" pattern (chevrons). The slanted segments 52 are interspersed with the periodically suppressed slanted segments 51 such that the suppressed slanted segments 51 provide coarse radial position information, and the slanted segments 52 provide fine radial position information. The suppressed segments 51 in the two transverse groups 76 between each pair of timing segments 50 can be radially offset. Further, the angle between the transverse slanted segments 52 (and the transverse suppressed segments 51) can vary, or remain the same, from the center towards the periphery of the disk 16. For example, the angle between the transverse segments 52 (and 51) can increase from the center of the disk (e.g. about 20 degrees) towards the periphery of the disk 16 (e.g. about 40 degrees).

The transverse geometry of the segments 51, 52 provides very detailed relative radial and circumferential position information for the head 34 as discussed above. Said differential time $\Delta t$ to each segment 51 or 52 from a timing segment 50 along a read track 60 of the head 34 provides radial position information. The differential times can be utilized to determine the radial position of the head 34 relative to the reference pattern 12.

As the disk 16 rotates under the head 34, if the head 34 moves radially relative to the transverse segments 45, said differential time $\Delta t$ to each slanted segment 45 changes, allowing detection of the direction of movement of the head 34 towards or away from the center of the disk 16. If the change in said differential times $\Delta t$ indicates that the head 34 crossed over a pair of transverse slanted segments 52 at a radial position where the distance between the transverse slanted segments 52 has decreased from a similar measurement over a previous pair of transverse slanted segments 52, then the head 34 has moved radially inward relative towards the center of the disk 16 since that previous measurement. If said distance has increased, then the head 34 has moved radially outward from the center of the disk 16 since that previous measurement. And, if the distance has remained the same, then the head 34 has not moved radially relative to the center of the disk 16 since the previous measurement. The above measurements can be made with respect to the transverse suppressed segments 51, whereby larger (e.g., greater than width of one slanted segment 52) radial movements of the head 34 can be measured. As such, eccentricity of the reference pattern 12 can be measured, and the heads 36 can be steered using disk drive electronics 40 to remove said eccentricity or timing non-uniformity and write final servo patterns (e.g., servo patterns 39) in concentric circular tracks on disks 18.

In one embodiment, the phase angle (i.e. phase difference) between each two pairs of oppositely/transverse slanted segments 52 (or oppositely inclined/transverse suppressed segments 51), as the head 34 crosses over them, provides a measure of the radial position of the head 34 and a measure of the radial movement of the head 34 relative to the reference pattern 12 from a previous measurement detailed above. A phase shift provides an indication of direction and amount of radial movement of the head 34. The phase angle changes as a function of the radial movement of the head 34, wherein: (i) the phase angle decreases if said distance between the transverse pair of slanted segments 52 decreases due to radially inward movement of the head 34, (ii) the phase angle increases if said distance between the transverse pair of slanted segments 52 increases due to radially outward movement of the head 34, and (iii) the phase angle remains the same if the head 34 does not move radially. As such, to remain at the same radial distance from the center of the disk 16, a constant phase angle should be maintained. Similarly, the phase angle between pairs of transverse/oppositely slanted suppressed segments 51 can be utilized to determine larger (e.g., greater than width of one slanted segment 52) radial movements of the head 34. As such, eccentricity of the reference pattern 12 can be measured, and the heads 36 can be steered using disk drive electronics to remove said eccentricity or timing non-uniformity and write final servo patterns 39 in concentric circular tracks.

Referring to FIG. 9A, the segment of the pattern 12 shown is located near the inner radius of the disk 16, and includes progressively: a Preamble segment; a Servo Address Mark ("SAM") segment; a first clock information 43 including timing segments 50, A Timing; a first pair of transverse groups 76, B Zig and C Zag, including suppressed and slanted segments 51, 52; a second timing segment 50, D Timing; and a second pair of transverse groups 76, E Zig and F Zag, including suppressed and slanted segments 51, 52. In this example, the periodicity of the suppressed segments 51 is such that there is a suppressed segment 51 per every nineteen slanted segments 52. Other periodicities for the slanted segments are also possible. Further, in other embodiments of the present invention the suppressed segments 51 can be irregular and not periodic. The head 34 moves over the pattern 12 over a read track 60 substantially perpendicular to the timing stripes 50 from the Preamble segment towards the E Zig–F Zag transverse groups 76. The transverse slanted position segments 52 are slanted in opposite directions relative to the radius of the disk 16, and include the suppressed segments 51 as described above. Use of two transverse groups 76 of segments 51, 52 in the example reference pattern 12 shown in FIG. 9A, provides radial position information across the angular slanted segments 52 and across the angular suppressed segment 51, and provides increased (e.g., doubled) sensitivity in detecting and measuring variation in radial position of the head 34 compared to the example reference pattern 12 shown in FIG. 5A. Further, the transverse groups 76 provide for correction of measurement errors due to variations in rotational speed of the disk 16 by canceling out timing errors in the spindle motor control.

A Fourier transform operation can be utilized to obtain the phase angles which represent the delay of each burst or group of segments designated by A Timing, B Zig, C Zag, etc. relative to a reference clock that is set in relation to the Preamble. Said phase angles provide position and timing information in the disk drive electronics 40 for writing the e.g. final servo pattern 39 on disks 18 using heads 36.

In one example operation, the head 34 moves down the read track 60, progressively across the A Timing timing segment 50, and then over the B Zig and C Zag transverse groups 76. In crossing over the B Zig and C Zag transverse groups 76, the head 34 crosses over a first suppressed segment 51 in the B Zig group 76 and then a second suppressed segment 51 in the C Zag group 76 at an opposite angle relative to the first suppressed segment. As the head 34 cross over the A timing segment 50, and the B Zig and C Zag transverse groups 76, the elapsed time from the A Timing timing segment 50 to each of the first and second suppressed segments 51 in the B Zig and C Zag groups 76 is measured, for example, by phase calculations from Fourier Transforms such as described in U.S. Pat. No. 5,784,296. "Method and apparatus for spectral analysis in a disk recording system", B. Baker and J. Fitzpatrick, incorporated herein by reference.

Said elapsed times provide two different delay time intervals from the A Timing timing segment 50 which are utilized to check and verify a change in the radial position of the head 34. As detailed above, for a particular radial position of the head 34 relative to the reference pattern 12, there are pre-selected expected delays between each suppressed segment 51 and an adjacent timing segment 50 such as the A Timing timing segment 50. Comparing the observed geometry of the segments 51 and 55 passing under the head 34, to that expected, in relation to a timing segment 50, the shift in radial position of the head 34 corresponding to that timing segment 50 can be determined. As the head 34 crosses over the pattern 12, the measured delay between crossing over a timing segment 50 and a suppressed segment 51 is converted into coarse radial position along the timing segment 50.

Figure 10:
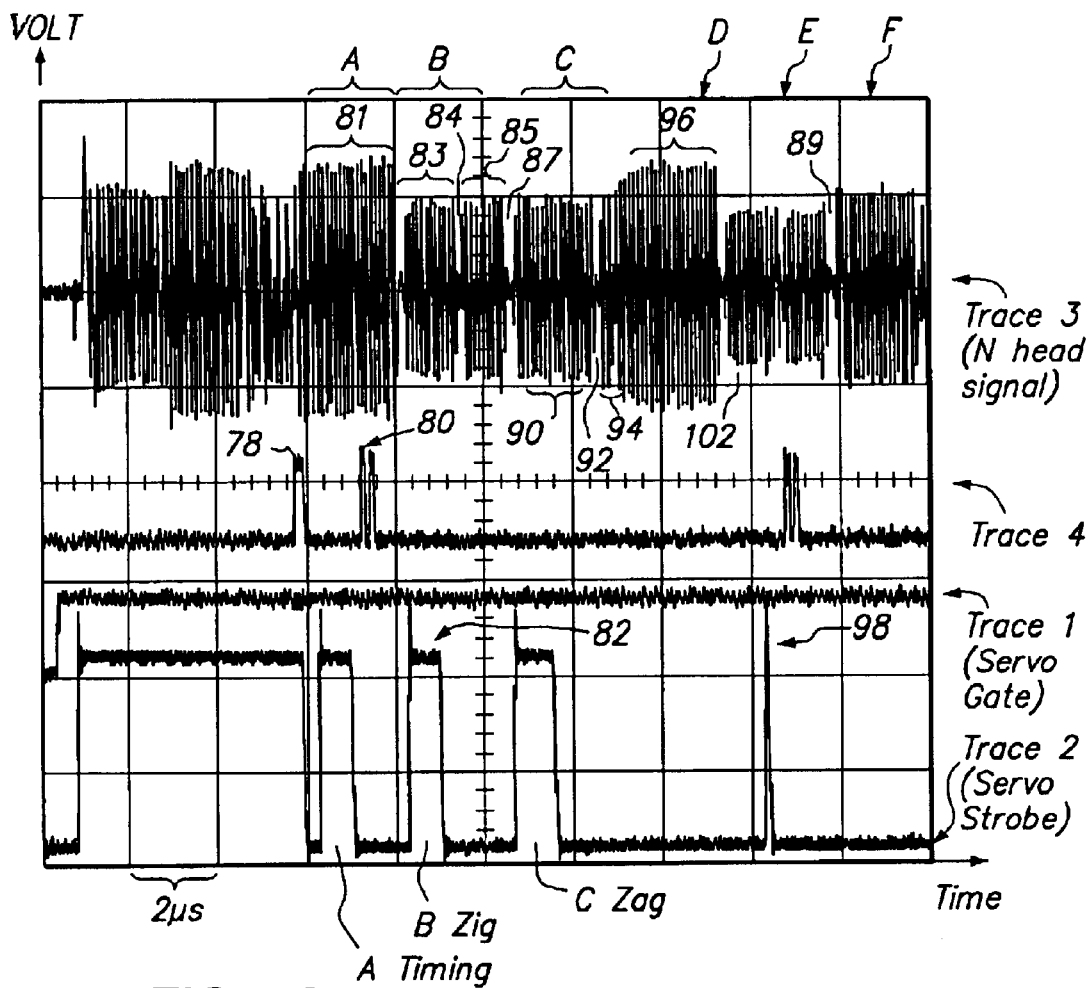
FIG. 10 shows a set of traces related to signals induced in a transducer head by a printed reference pattern.

Referring to FIG. 10, trace 3 illustrates representative waveforms from left to right for the signals induced in the head 34 (e.g., digitized samples from the channel chip 21 such as the Moray™ channel chip) as the head 34 crosses over the reference pattern 12 of FIG. 9A along said read track 60. The waveform in trace 3 begins from left indicating the induced signals to head 34 from the Preamble and SAM segments. Trace 4 illustrates an output signal from the channel chip 21 in the drive electronics 40, and includes a first pulse 78 which marks the end of the Preamble and SAM segments having passed under the head 34. Pulse 78 can be used as a reference point for all timing measurements. The channel chip 21 includes a clock synchronized to the frequency and phase of the Preamble, wherein all outputs are relative to said clock. The clock cycle where SAM is found is a convenient reference location, but can be shifted by an integer number of clock cycles to some other convenient reference location such as the start of the A Timing burst 50. The pulse 78 marks beginning of a waveform segment 81 in trace 3 corresponding to signals induced by the A Timing timing segment 50. Then in trace 4 pulses 80 show portions of the cosine and sine information of burst fields in the A Timing timing segment 50.

Trace 1 and trace 2 show logic control signals (e.g., commands) into the channel chip 21. Said logic control signals enable the channel chip 21 to synchronize the clock therein with the Preamble. After SAM is found, the head 34 reads digital data following SAM. Portions of the read bits are output as shown in trace 4. Then the control signal in trace 2 is lowered (e.g., digital 0), and raised (e.g., digital one) to allow Discrete Fourier Transform (DFT) of data spanned by each pulse such as pulse 82 for the first part of the B Zig burst. Skinny/narrow pulse window 98 shows reading one cycle of the E Zig burst.

Trace 2 includes a control signal to enable decoding of SAM and Gray Coded Data. The control signal in trace 2 is then dropped (e.g., digital 0) and later raised (e.g., digital 1) to enable a DFT of the corresponding portion (about one third) of the A, B and C Timing bursts. The pulse 82 in trace 2 enables the DFT of a waveform segment 83 in trace 3 indicating signals induced by the slanted segments 52 in the B Zig group 76. A notch 84 in trace 3, indicates the signal change due to the first suppressed segment 51 in the B Zig group 76.

The waveform segment 85 in trace 3 indicates signals induced by the remaining slanted segments 52 in the B Zig group 76 after said suppressed segment 53. A notch 87 in trace 3 indicates change in the signal due to a radial gap 88 between the B Zig and the C Zag transverse groups 76. Thereafter, the waveform segment 90 in trace 3 shows signals due to slanted segments 52 in C Zag group 76, followed by a notch 92 indicating passage of a suppressed segment 51 in the C Zag group 76 under the head 34. The waveform segment 94 then shows signals induced by the slanted segments 52 in the C Zag group after the suppressed segment 51. The high amplitude waveform segment 96 in trace 3 shown signal is due to the D Timing timing segment 50. Thereafter, the trace 3 waveform corresponds to the signals due to the E Zig and F Zag groups similar to that described for the B Zig and the C Zag groups, respectively. Another notch 89 in trace 3 indicates change in the signal due to a radial gap 88 between the E Zig and the F Zag transverse groups 76.

Trace 2 includes the narrow pulse 98 that enable a DFT over a time interval corresponding to one cycle of the slanted or timing segments. The pulse 98 can be delayed relative to a reference clock that is synchronized in frequency and phase with the Preamble. The reference can be chosen as the SAM, which is a unique group of pulses used for this purpose. The pulse 98 is shown in more detail in FIG. 11. The horizontal scale of the trace is in microsecond delay from an arbitrary point such as the A Timing timing segment 50. Firmware in the disk drive electronics 40 controls the delay to locate the suppressed segments 51 to determine the coarse position. The vertical scale of the trace is the head signal amplitude. Trace 3 in FIG. 10 corresponds to the signal induced in the head 34 by the pattern in FIG. 9A, and trace 4 in FIG. 10 corresponds to an interval for measuring waveform in trace 3 to find a suppressed segment 51. As such, trace 4 in FIG. 10 is a timing control for the window for the trace in FIG. 11.

Figure 11:
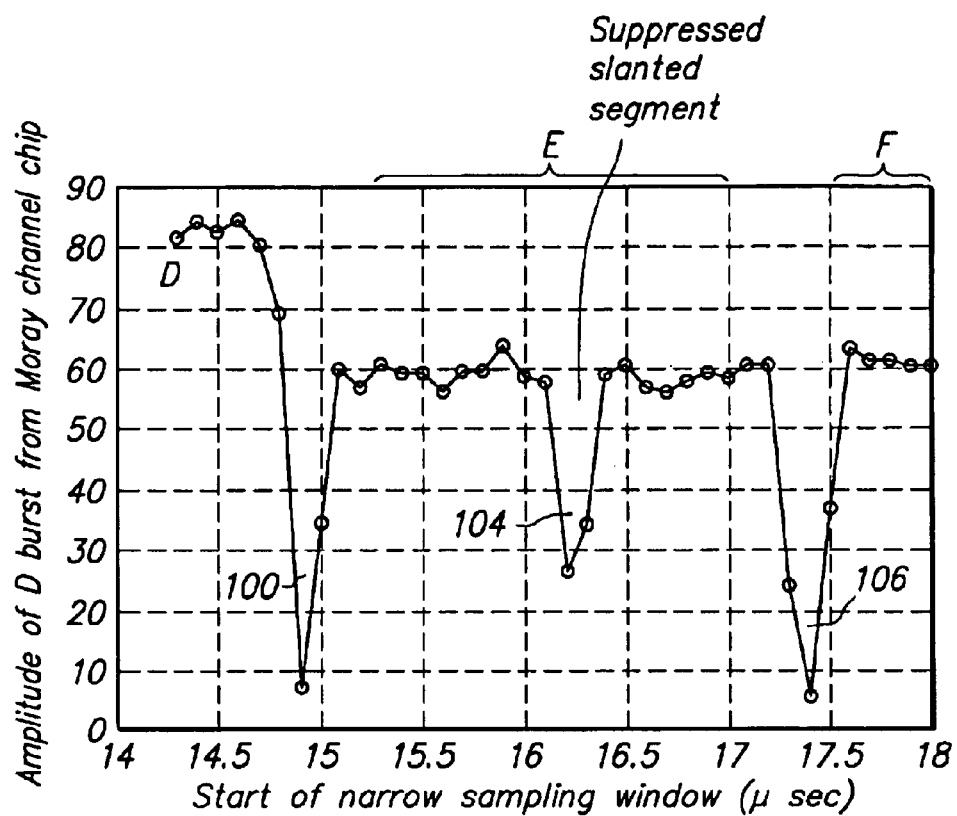
FIG. 11 shows a trace for locating features of the printed reference pattern using the traces in FIG. 10.

In FIG. 11, the head signal amplitude starts out at about 80 counts, then at about 14.8 µs a notch 100 in the signal corresponds to a notch 102 in trace 3 of FIG. 10 after the Timing D timing segment 96. The head signal in FIG. 11 then rises back to about 60 counts until a notch 104 at about 16.2 µs indicating said first suppressed 51 segment in the E Zig group 76. Thereafter, the head signal rises again to about 60 counts until a notch 106 at about 17.3 µs corresponding to the radial gap 88 between the E Zig and the F Zag transverse groups 76. The head signal then rises again to about 60 counts as the head 34 crosses over the F Zag group 76. Though not shown, the signal dropped again when the head 34 crossed over a suppressed segment 51 in the C Zag group 76 similar to the notch 104 that at 16.2 µs.

As such, the suppressed segments 51 can be detected by moving a timing window, similar to window 98 of FIG. 10, along the signal induced to the head 34 by the reference pattern 12, counting the number of slanted segments 52 crossed over by the head 34 from a timing segment 50 until a suppressed segment 51 indicated by a notch in the induced head signal is found. Said count of the slanted segments 52 is a coarse representation of the time elapsed between the head 34 crossing a timing segment 50 and a suppressed segment 51, and provides coarse position information based on the slope of the suppressed segment 51. The measurement steps described above for detecting eccentricity of the reference pattern 12 in e.g., FIG. 5A using elapsed times to suppressed segments 51 are equally applicable to the pattern of FIG. 9A to determine eccentricity and timing non-uniformity at the crash stop, and later used in servo writing to eliminate the eccentricity.

In the reference pattern 12 of FIG. 9A, the timing bursts A Timing and D Timing can be used to calibrate small phase errors that arise due to spindle jitter or phase-lock-loop frequency errors induced by various noise sources. The preamble, SAM and digital data, and the A Timing and D Timing bursts are laid out with transitions along isochrones. Preferably, the time interval between timing bursts A Timing and D Timing is an integer multiple of the time required for passage of one segment 52 and one space 51 under the read head 34. Small variations in spindle speed or in the frequency of the clock used to measure timing of all the bursts in FIG. 9A may cause small deviations in the measured phase difference of the A Timing and D Timing. By assuming a simple linear distribution of that phase difference across the whole set of A Timing, B Zig, C Zag, and D Timing bursts, a useful correction to the phases measured for the intermediate bursts B Zig and C Zag can be estimated.

Figure 9B:
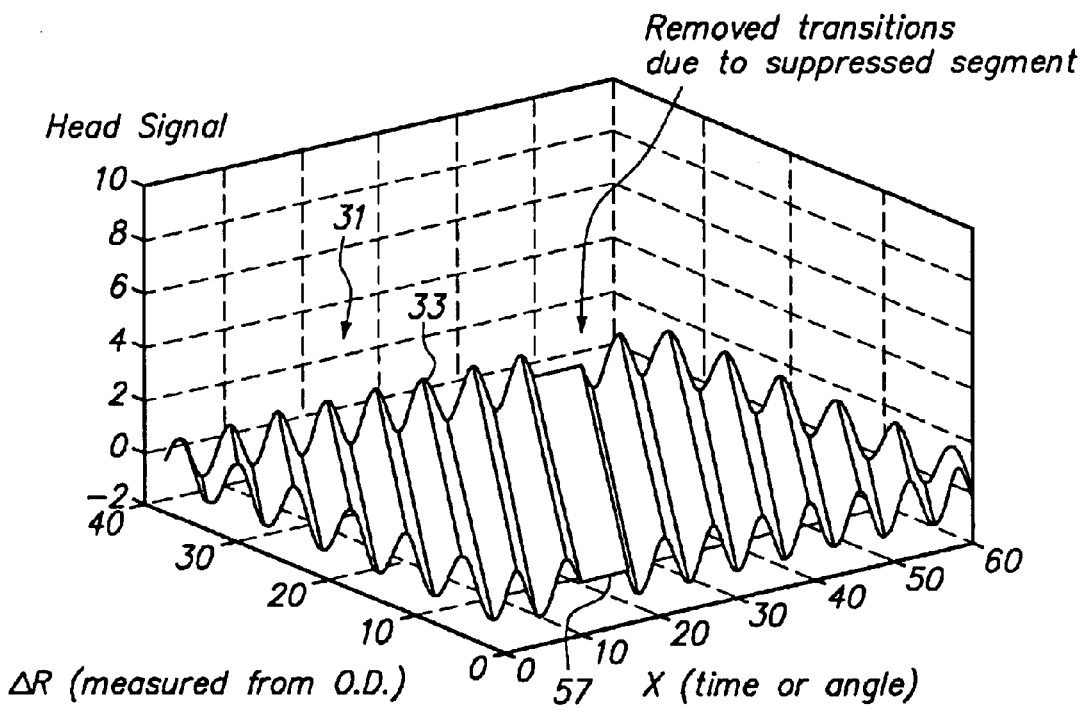
FIG. 9B shows a 3D "wash board" waveform representation of head signal variations along the radial and down track directions of a pattern such as in FIG. 9A.

Because of the periodic structures of the B Zig and C Zag bursts (and E Zig and F Zag bursts), the phases of the entire position of bursts B Zig, C Zag, E Zig and F Zag changes by one cycle if the head 34 moves along the radius of the disk 16 from one slanted segment 52 to the corresponding point of the next slanted segment 52. If the reference pattern 12 moves upward, the phase of all the read samples along the track 60 are shifted by the same amount as the leading edge of a position burst (e.g., B Zig, C Zag, E Zig or F Zag). This relation is illustrated in FIG. 9B showing a 3D "wash board" waveform of head signal variations along the radial and down track directions of disk 16. In one example, the phases of all position bursts B Zig, C Zag, E Zig and F Zag which lie within a measurement window 98 defined by raising the control signal in trace 2 (servo strobe FIG. 10), are measured (e.g., effectively averaged).

FIG. 9B shows a schematic surface 31 representation of the amplitude of the head signal induced to the head 34 flying over a portion of a collection of e.g. slanted position elements 76 B Zig, C Zag, E Zig and F Zag in FIG. 9A. The head signal from a single track corresponds to a slice through said surface 31 by a plane in the X or time direction. Moving the head 34 inward along the radius of the disk 16 corresponds to moving the slicing plane in the Δdirection. For the purposes of this example, the units in FIG. 9B are arbitrary, however contemporary values of the coordinates can be in the order of tenths of one micron.

As shown in FIG. 9B, the head signal has been subjected to a low pass filter to eliminate much high frequency noise and to leave a nearly sinusoidal signal 31 from the slanted magnetic transitions 52. One of the slanted elements 52 has been suppressed (e.g., suppressed segment 51) which eliminates one pair of transitions 33 or one cycle of the ideal sine wave 31, providing a flat angled strip 57, corresponding to notches 84 or 92 in trace 3 of FIG. 10. In this example, most sinusoidal portions of the head signal are repeated periodically and rapidly for about six cycles as the head 34 is moved in the radial direction. At the same time, the flat or suppressed portion 57 moves continuously to larger values of X or time. Measuring the time, X, of the flattened cycle 57 from the start (X=0) of the signal/collection of sine waves (or from some other reference event) provides a coarse head position measure which is used to determine the number of that have been traversed by the head 34 from the initial radius (ΔR=0). This can be achieved using a sampling window of one cycle length in the X direction and moving that window in the X direction until the accumulated signal in the window drops to nearly zero. That determines the nearest integer number of cycles. The fine position component, or fraction, of a cycle can be evaluated from the total signal across the sine wave collection, for example, by Fourier transforms.

Using the channel chip 21, such as the Moray channel chip from Lucent™ Corp., in the drive electronics 40, discrete sine and cosine transforms of the read signals from the head 34 are generated as the head 34 sweeps across the reference pattern 12 along the read track 60 (FIG. 9A). Discrete Fourier Transforms provide information about displacements of the reference pattern 12 relative to the head 34 along the radial direction of the disk 16. By converting the atan(sine/cosine), information about position of the head 34 in the form of an angle or fraction of a cycle moved in the radial direction is obtained. By multiplying said phase angle in radians by a scale factor equal to period of a position burst pattern (e.g. B Zig, C Zag, E Zig or F Zag bursts) divided by $2\pi$, the change of radius is computed.

The head 34 can traverse e.g. tens of thousands of cycles of position bursts (e.g., B Zig, C Zag, E Zig or F Zag zig zags bursts) as the head 34 is moved from the inner diameter to the outer diameter of the disk 16. As such, the total angle or number of cycles traversed by the head 34 from a reference radius (e.g., at crash stop) is maintained. An interpolator function using a quadrature head signals or sine and cosine components from the position bursts can be used to keep track of the multiple of cycles as well as fractions of cycles. Interpolation is commonly used in interferrometers, optical encoders, and other measurement systems.

Once repeatable runout and repeatable timing errors have been subtracted from measurements of the reference pattern 12, and the disk drive servo loop has positioned one of the heads 36 over a substantially concentric track location above one of the rotating blank disks 18, a final servo pattern can be written at a relatively fine resolution defined by the write element 35 of the head 36. For example, in FIG. 12, the write element 35 can record a final servo pattern 39 comprising digital data for synchronization, servo address mark, track number, head number, etc., followed by e.g. untrimmed burst field patterns. In one example, the final servo pattern 39 includes servo pattern position bursts A, B, C and D shown in FIG. 12. Each servo burst requires a separate pass of the disk 18 by the write element 35, with offsets of one half track width for the example in FIG. 12. Generally the track numbers can change at the boundaries of the final servo tracks. Many other combinations of digital data and position bursts are possible for the final servo pattern, and they can all be self servo written based upon position and timing information derived from the reference pattern 12 as described above.

Figure 12:
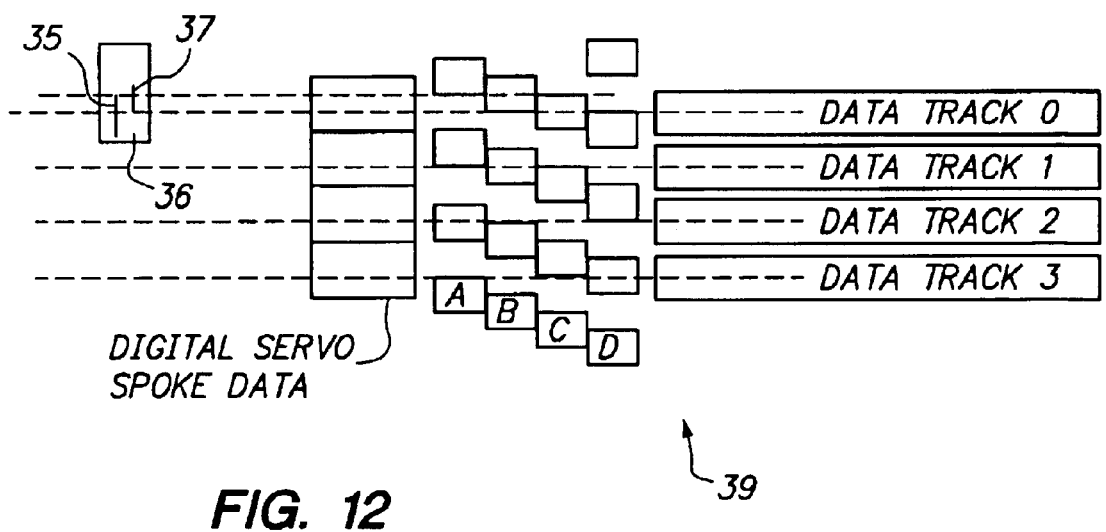
FIG. 12 shows a final servo pattern in a band of adjacent circumferential data tracks which has been self-written by the FIG. 2 assembled disk drive, based on the reference pattern printed at the FIG. 1 printing station, in accordance with principles of the present invention.

In FIG. 12, after first servo bursts, such as servo bursts A, are written, the head 36 is stepped e.g. one half data track pitch and the next servo bursts, e.g. servo bursts B, are written on the track. Then, the head 36 is stepped one half track pitch, and third servo bursts, e.g. servo bursts C, are written. The head 36 is then stepped one half track pitch, and fourth servo bursts, e.g. servo bursts D, are written. Other servo patterns and servo burst pitches are also known and can be utilized. The writing of finely resolved data bursts to product specification occurs throughout the radial extent of the data storage area of the disk 18. Once one data surface is written with embedded servo sectors or wedges, a next surface can be written. In some disk drives including high performance write channels, or when servo patterns are staggered from surface to surface, it is practical to write multiple storage surfaces with servo patterns during a single revolution by switching to write heads on each of several disk surfaces.

Because the GMR read element 37 is considerably narrower than the inductive write element 35, it is necessary to provide several pairs of burst circumferential edges across the pitch of each track. For example, adjacent circumferential edges of servo bursts A and B provide one servo location, whereas adjacent circumferential edges of servo bursts D and E provide another servo location. Adjacent circumferential edges of servo bursts B and C provide a third servo location, while adjacent circumferential edges of servo bursts E and F provide a fourth servo locations, etc.

Figure 13:
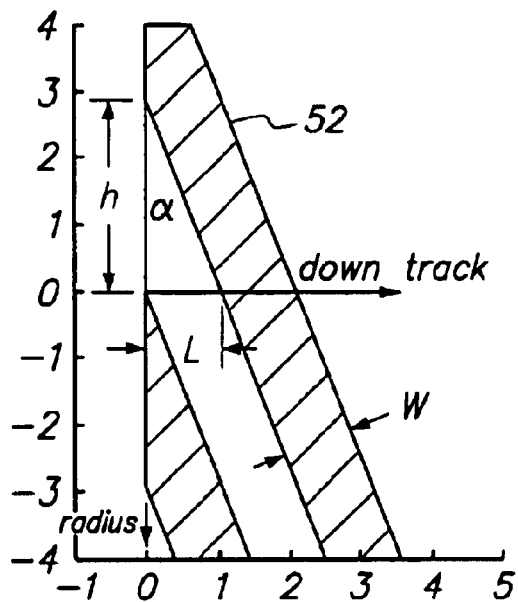
FIG. 13 shows schematic details of example partial slanted position segments in a reference pattern in FIG. 3.

Referring to FIG. 13, schematic details of slanted segments 52 such as included in the patterns of FIGS. 3, 4, 5, and 9A are shown. The cycle of one segment and one space in the radial direction corresponds to distance 2×h for a change of $2\pi$ radians in the phase of one position burst such as B Zig, C Zag, E Zig or F Zag. The difference in phases of two oppositely slanted bursts such as B Zig and C Zag requires only half the radial distance, or h, to change by $2\pi$ radians.

The slanted segments 52 have a width w, but a slightly longer dimension L in the down track 60 or circumferential direction. In some cases it is desirable to maintain the same radial scale factor at all radii. Then the radial spacing h is constant, but L is proportional to the local radius and the angle α increases at larger radius. As such, the finest line widths L occur at the inner radius. In the following description, subscripts "i" and "o" are used for dimensions and parameters at the inner diameter (I.D.) and outer diameter (O.D.) of the disk, respectively. An example nominal inner diameter $R_i$ can be about $R_i$=21.0 mm, and example nominal inner diameter $R_o$ can be about $R_o$=46.3 mm. The label "radius" in FIG. 13 indicates the general direction of isochrones (e.g., spokes 11 in FIG. 11), and the angle between the isochrone and a slanted segment 52 is α. As such, L=w/cos α. Choosing e.g. $\alpha_i$=20 degrees provides the circumferential length between magnetic transitions as slightly more than one micron. By rounding the number of transition cells per revolution down to a value of N=12000, a cell length at I.D. is $L_i$=($2\pi R/N$)=1.099557 μm. The length intercepted on the isochrone (height h), is h=L/tan α. From the above-selected values at the I.D., the height $h_i$=$L_i$/tan $\alpha_i$=3.021009 μm. To maintain a constant scale factor between radial displacement and phase, the same value of height h can be used at any radius. Because the time between transitions is constant, the cell length is proportional to radius, where L=$L_i$×R/$R_i$. The length at the O.D. is, $L_o$=$L_i$× $R_o$/$R_i$=$L_i$×46.3 mm/21.0 mm=2.424261 μm. The resulting angle at the O.D. is α=arctan ($L_o$/$h_o$)=38.745908 degrees.

In this embodiment, the pattern 12 can have 200 spokes 11, wherein the total spoke length is 600L. Example components of a spoke 11 as shown in Table 1:

TABLE 1

| Component name and function | Length (L) |
| --- | --- |
| Preamble 1 | 76 |
| SAM 1 | 18 |
| Dig 1 Index | 2 |
| Dig 2 Wedge | 2 |
| Burst A Synch Timing | 30 |
| Gap | 2 |
| Burst B Position Zig | 30 |
| Gap | 2 |
| Burst C Position Zag | 30 |
| Gap | 2 |
| Burst D Timing (for correction) | 30 |
| Gap | 2 |
| Preamble 2 | 76 |
| SAM 2 | 18 |
| Burst S synch for write | 30 |
| Write gap | 250 |

Figure 14:
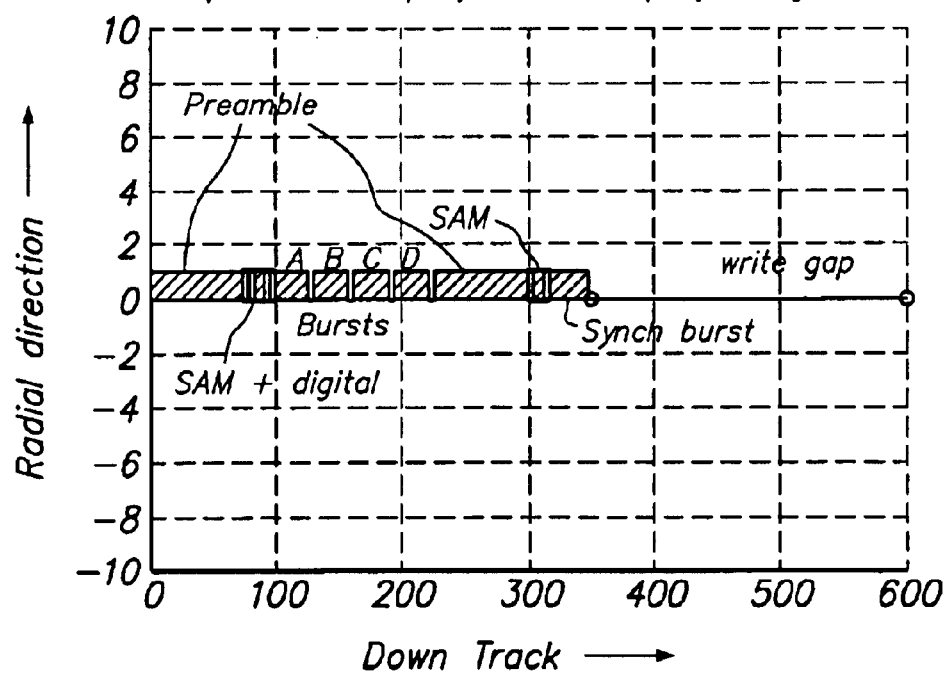
FIG. 14 shows schematic details of another example spoke in pattern of FIG. 3.

A schematic diagram of a portion of a spoke 11 is shown in FIG. 14. To provide correction for eccentricity, the following issues are considered. In general, the central hole of the disk is larger than the disk drive spindle for ease of assembly, and the maximum clearance of about 100 μm allows an offset of as much as 50 μm between the centerlines of the disk and the spindle. An example estimated offset of the printed pattern 12 relative to the disk center can be about 15 μm. The resulting maximum eccentricity of 65 μm is measured in the initial stage of self-servo writing as described above, and is corrected so that final product tracks are essentially circular and centered with respect to the axis of rotation of the disk.

Figure 15:
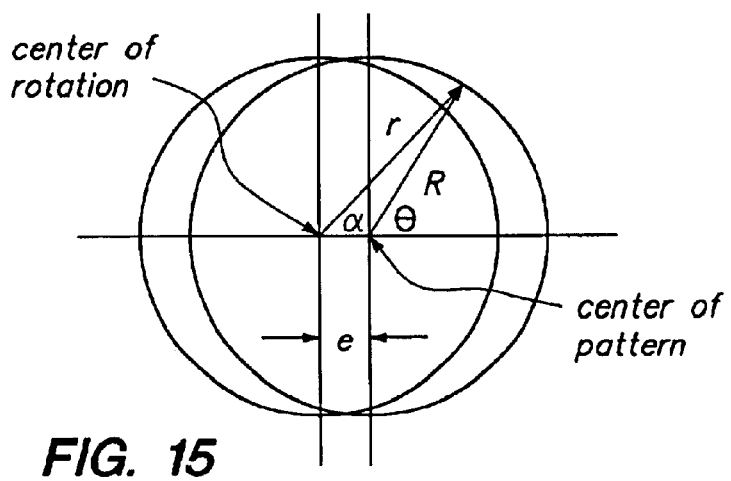
FIG. 15 shows example eccentricity of a reference pattern relative to the axis of rotation of a disk.

A schematic diagram of an eccentric pattern 12 is shown in FIG. 15, wherein r represents actual radius measured from the axis of rotation of the disk, and R represents apparent radius measured from the center of the pattern. Phase measurements from the channel chip 21 as described above provide R, and a total eccentricity e can be corrected. An observation point on the pattern is related to actual radius, wherein $re^{i\alpha}$=e+$Re^{i\theta}$, and $r^2$=$R^2$+$e^2$+2eR cos θ. A dimensionless measure of the eccentricity ε is introduced with a bound at the I.D., where ε≡e/R≦65 μm/$R_i$=0.003095. Expanding the latter relation by binomial expansion provides Relation 1 as follows:

$$r = R[1+\epsilon^2+2\epsilon \cos \theta]^{1/2} = R[1+\epsilon^2/4+\epsilon \cos \theta - \epsilon(\cos 2\theta)/4+O(\epsilon^3)]$$

(Relation 1)

where $O(\gamma^3)$ is a very small term bounded by a constant times $\gamma^3$.

In the initial stage of self-servo writing, the actuator is forced against the crash stop where r is known. Data from all the spokes 11 are averaged for several revolutions of the disk 16 to reduce effects of noise from electronics and spindle bearings. Then a DFT is used to calculate the first harmonic term of Relation 1, which provides the total eccentricity e and the phase of the angular offset corresponding to θ=0 where the runout is maximum. This can be implemented by observation of a repetitive component of the voice coil motor current and performing a reverse transformation to derive the PES that caused it.

Those skilled in the art will appreciate that the printed servo reference pattern 12, once printed onto a surface 14 of a reference disk 16 and following installation of the reference disk into the disk drive 22, provides the same positioning function as a servowriter, at far less capital investment. While the self-scan, self-servowrite process may require greater time than without self-servowriter, the operation is carried out after the disk drive is fully assembled, sealed against particulate contamination, and integrated with the disk drive electronics. This extended burn-in time period is advantageous because most disk drive failures occur during the initial burn-in interval. Those disk drives surviving self-scan, burn-in and self-servowrite, are most likely to work reliably in use.

While the present invention has been explained in terms of a single reference pattern 12 on the disk 16, under some conditions of very high track densities, it can be useful or necessary to print reference patterns on all disk surfaces, and then use a reference pattern of a particular surface to generate and write a final servo pattern for that particular surface. This requirement may arise in conditions when vibration or turbulence otherwise cause excessive deviation of a particular head from a desired location even though another head of the drive is accurately following a printed reference pattern. In effect, the mechanical tolerances in a particular drive, or drive design, may require that each head be separately controlled with its own position reference when self-writing the final product servo pattern. This approach can also be useful for transducer heads with dual-stage actuators, because each head can follow the local printed servo reference pattern while writing high resolution product servo patterns onto the same storage surface.

A single surface of a multi-surface disk drive can include a magnetically printed reference pattern which is used to provide clock information for writing all other surfaces. This approach can enable servowriting outside a clean room environment, when it is combined with a light-transparent head-viewing window of the HDA housing and non-contact head positioning enabled by external servo writing equipment, e.g. an optical push-pin servo writer, such as described in "Servotrack write with Improved positioning System," Bill R. Baker and Alex Moraru, IEEE Trans. On Magneics, Col. 33, No. 5, September 1997, pp. 2623–2625; and U.S. Pat. No 5,771,130, "Method and Apparatus for Non-Constant Servo Writing", B. R. Baker, both incorporated herein by reference.

The present invention eliminates the expensive servowriter and servowriting operations within an expensive clean room environment. A low resolution printed servo reference pattern 12, preferably transferred as part of the disk manufacturing operation, is used to facilitate self-servowrite of a disk drive to product specification after the particular drive has been fully assembled, sealed from the ambient, and checked out both mechanically and electrically. In effect, the printed reference pattern 12 and disk becomes a self-contained servowriter, providing both clock and position information inside of the drive. This approach enables higher TPI densities compared to conventional servowriters, as servowriter positioning errors and low frequency relative motion between head and disk are eliminated. In addition, the data disk track pitch can be optimized for each separate disk storage surface and head combination, fully enabling optimized TPI, since it can be made cost effective to have long self-servowrite times once the servowriters are eliminated. This self-servowrite approach using printed servo patterns enables and facilitates self-servowrite over multiple product generations and considerable increases in TPI densities.

Eccentricity in the printed servo reference pattern 12 can be removed by software and signal processing present within the disk drive electronics 40, and embedded servo sectors/pattern (e.g. servo pattern 39) following true circular tracks can be written. In the self-servowrite process, product servo pattern information 39 can be written directly on the printed surface 14, either overwriting the printed reference pattern 12 or being written into unprinted areas of the surface 14. The pattern 39 is also written on the storage surfaces of the disks 18.

The printed reference pattern 12 can be of lower density and lower quality than the final servo pattern 39, since the entire data region between the final product embedded servo sectors can be used to contain the printed servo reference patterns. Such low resolution printed reference patterns can be filtered or treated with other signal processing techniques that provide position and timing information for self-servowrite.

Figure 16:
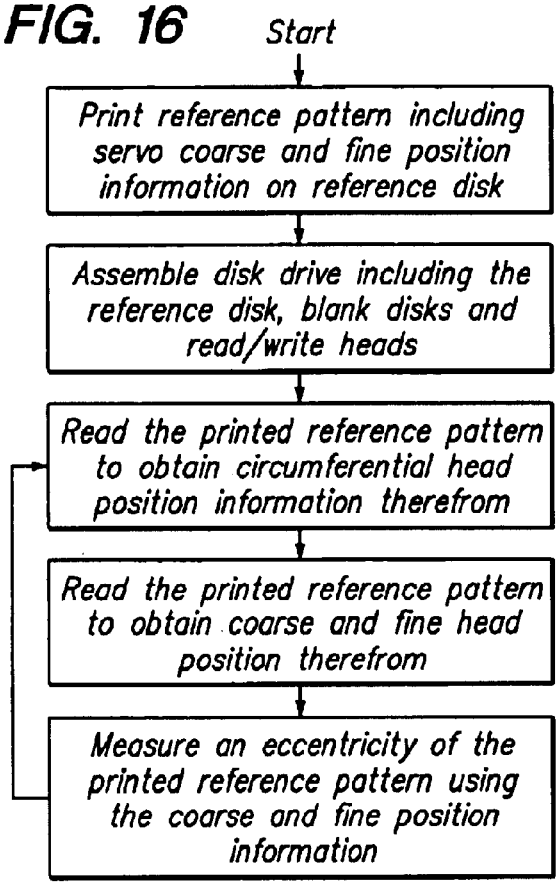
FIG. 16 is a flowchart showing printing the reference pattern and using head position information to measure pattern eccentricity.
Figure 17:
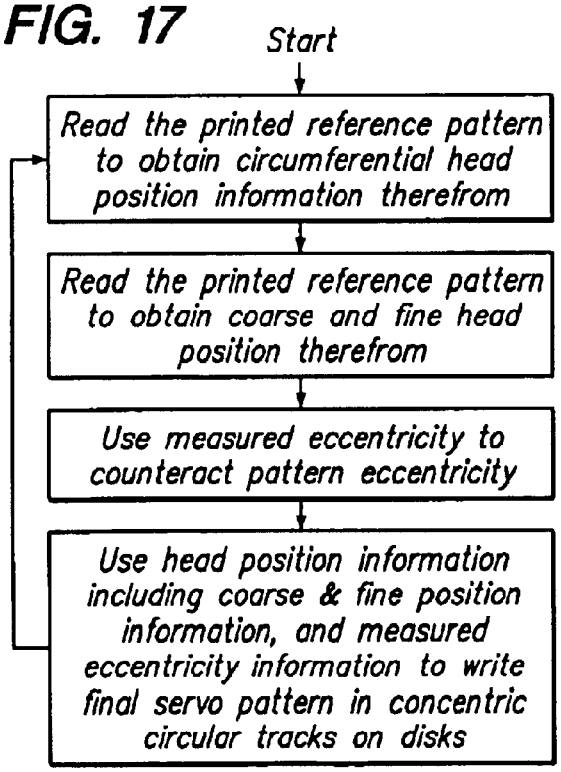
FIG. 17 is a flowchart showing reading the reference pattern to obtain position information to self servowrite final servo patterns.

For example, in one embodiment of the present invention, the reference pattern printing is performed at about ⅛th the density of the final product/servo pattern written by the self servowrite method of the present invention. As such, the process begins with a coarse reference, and data is filtered from many transitions to extract a much sharper reference. FIG. 16 is a flowchart showing example steps of printing the reference pattern 12 and using head position information to measure pattern eccentricity, and FIG. 17 is a flowchart showing example steps of reading the reference pattern to obtain head position information to self servowrite final servo patterns, according to the present invention.

The printed reference patterns 12 include timing-based positional information as illustrated above, or the patterns can be frequency-encoded, i.e. different frequencies are printed on adjacent segments of the reference pattern 12. Examples of frequency-based servo patterns for disk drives are provided in commonly assigned U.S. Pat. No. 5,661,750 to Patapoulian et al., entitled: "Wide BiPhase Digital Servo Information Detection, and Estimation for Disk Drive Using Servo Viterbi Detector"; and, U.S. Pat. No. 4,188,646 to Sordello, entitled: "Sectorized Data Path Following Servo System." These two patents are incorporated herein by reference.

The present invention has been described in considerable detail with reference to certain preferred versions thereof; however, other versions are possible. For example, it should be clear to those skilled in the art that the present invention may also be utilized in conjunction with other servo patterns and storage devices using servo patterns. Therefore, the spirit and scope of the appended claims should not be limited to the description of the preferred versions contained herein.

What is claimed is:

1. A method for self-servo writing a disk drive comprising the steps of:

(a) transferring a servo reference pattern by magnetic printing onto at least one storage surface of a disk, wherein a resulting printed reference pattern comprises:

(1) servo clock information providing transducer head circumferential relative position information, and (2) servo position information including coarse position information for providing transducer head coarse radial relative position information, and fine position information for providing transducer head fine radial relative position information;

said servo clock information comprising a pattern of one or more substantially radial timing segments, and said coarse position information and said fine position information comprising slanted segments, such that sets of one or more timing segments are separated by the slanted segments of coarse position information and fine position information;

wherein the printed reference pattern has a resolution lower than a disk drive servo pattern including features proportional to head gap widths of data transducer heads included in the disk drive;

(b) assembling the disk drive including the steps of installing the disk into the disk drive and enclosing the disk and the data transducers within a housing sealed against particulate contamination from an external ambient environment;

(c) reading the printed reference pattern from the disk via a transducer head;

(d) using the read servo clock and the servo position information to precisely position the data transducers at concentric track locations of disk storage surfaces; and (e) self-writing disk drive servo patterns onto the storage surfaces at the concentric track locations with the data transducers in accordance with the disk drive servo pattern features.

2. The method of claim 1, wherein the slanted segments between the timing segments are organized into a plurality of substantially radially spaced sets of slanted segments.

3. The method of claim 1, wherein the slanted segments between the timing segments include periodically suppressed slanted segments, and wherein the coarse position information comprises the periodically suppressed slanted segments, and the fine position information comprises the unsuppressed slanted segments.

4. The method of claim 3, wherein the slanted segments are substantially radially spaced.

5. The method of claim 1, wherein the servo position information comprises a multi-frequency periodic pattern having periodically suppressed cycles, and wherein the coarse position information comprises the periodically suppressed cycles, and the fine position information comprises the unsuppressed cycles.

6. The method of claim 1, wherein the step of printing the reference pattern includes transferring multi-frequency segments, wherein the multi-frequency segments provide head position information.

7. The method of claim 1, wherein: (i) the fine position information comprises a fine pattern of slanted segments, (ii) the coarse position information comprises a coarse pattern of slanted segments, the coarse pattern of slanted segments being interspersed with the fine pattern of slanted segments, and (iii) sets of one or more timing segments are separated by said interspersed coarse and fine patterns of slanted segments.

8. The method of claim 7, wherein the slanted segments of said fine pattern are radially finely spaced relative to one another.

9. The method of claim 7, wherein the slanted segments of said course pattern are radially coarsely spaced relative to one another.

10. The method of claim 1 further comprising the steps of using a circuit to counteract at least one eccentricity and timing non-uniformity of the printed reference pattern before self-writing the disk drive servo patterns.

11. The method of claim 1, wherein the slanted segments between the timing segments are organized into at least two circumferentially adjacent sets of transverse slanted segments.

12. The method of claim 11, wherein the slanted segments between timing segments include periodically suppressed slanted segments and wherein the coarse position information comprises the periodically suppressed slanted segments, and the fine position information comprises the unsuppressed slanted segments.

13. The method of claim 12, wherein the fine position information comprises the unsuppressed slanted segments forming a fine pattern of radially spaced unsuppressed slanted segments.

14. The method of claim 12, wherein the coarse position information comprises the suppressed slanted segments forming a coarse pattern of radially spaced suppressed slanted segments.

15. The method of claim 12, wherein: (i) the fine position information comprises a fine pattern of unsuppressed slanted segments, (ii) the coarse position information comprises a coarse pattern of suppressed slanted segments, the coarse pattern being interspersed with the fine pattern, and (iii) sets of one or more timing segments are separated by said interspersed coarse and fine patterns.

16. A method for self-servo writing a disk with the aid of a printed reference pattern transferred by magnetic printing onto a storage surface of a first disk, wherein the printed reference pattern includes: (i) servo clock information providing transducer head circumferential relative position information and (ii) servo position information including coarse position information for providing transducer head coarse radial relative position information and fine position information for providing transducer head fine radial relative position information, said servo clock information comprising a pattern of one or more substantially radial timing segments, and said coarse position information and said fine position information comprising slanted segments, such that sets of one or more timing segments are separated by the slanted segments of coarse position information and fine position information, and wherein reference pattern features have a resolution lower than disk drive servo pattern features proportional to a head gap width of a data transducer head included in the disk drive, the method comprising the steps of:

(a) assembling the disk drive including the steps of installing the first disk and transducer into a housing of the disk drive and enclosing the housing to prevent particulate contamination;

(b) reading the printed reference pattern from the first disk via the transducer;

(c) using the servo clock and servo position information to precisely position the transducer head at concentric data track storage locations on the disk storage surface; and (d) self-writing disk drive servo patterns onto the storage surface at the concentric track locations via the transducer head in accordance with the disk drive servo pattern features.

17. The method of claim 16 further comprising the steps of using disk drive electronics to counteract eccentricity of the printed reference pattern before self-writing the disk drive servo patterns.

18. The method of claim 16 wherein the disk drive includes multiple disks and storage surfaces, and the assembling step includes installing the multiple disks along with the first disk, and the step of self-writing disk drive servo pattern comprises writing disk drive servo patterns onto storage surfaces of the multiple disks with the aid of the printed reference pattern.

19. An embedded reference pattern for use in self-servo writing a disk drive including one or more transducer heads, a first disk and one or more rotating disk media, wherein the reference pattern is transferred by magnetic printing onto a storage surface of the first disk resulting in a printed reference pattern, the reference pattern comprising:
   (a) servo clock information providing transducer head circumferential relative position information, and
   (b) servo position information including coarse position information for providing transducer head coarse radial relative position information, and fine position information for providing transducer head fine radial relative position information;
      said servo clock information comprising substantially radial timing segments, and said coarse position information and said fine position information comprising slanted segments, such that sets of one or more timing segments are separated by the slanted segments of coarse position information and fine position information;
      wherein the reference pattern has a resolution lower than disk drive servo pattern features proportional to head gap widths of data transducer heads included in the disk drive;
      such that, during a self-servo writing operation, the printed reference pattern is read via the one or more transducer heads, and the servo clock and the servo position information is used to precisely position the one or more data transducers at concentric track locations of disk storage surfaces to enable self-writing of disk drive servo patterns onto the storage surfaces at the concentric track locations with the one or more transducers in accordance with the disk drive servo pattern features.

20. The reference pattern of claim 19, wherein the slanted segments between each pair of adjacent timing segments include periodically suppressed slanted segments, and wherein the coarse position information comprises the periodically suppressed slanted segments, and the fine position information comprises the unsuppressed slanted segments.

21. The reference pattern of claim 20, wherein adjacent slanted segments are substantially radially spaced.

22. The reference pattern of claim 19, wherein: the fine position information comprises a fine pattern of slanted segments, the coarse position information includes a coarse pattern of slanted segments, the coarse pattern of slanted segments being interspersed with the fine pattern of slanted segments, and the timing segments are separated by the servo position information.

23. The reference pattern of claim 22, wherein the slanted segments of said fine pattern are radially finely spaced relative to one another.

24. The reference pattern of claim 22, wherein the slanted segments of said coarse pattern are radially coarsely spaced relative to one another.

25. The reference pattern of claim 19, wherein at least the coarse position information can be used to measure an eccentricity of the printed reference pattern.

26. The reference pattern of claim 25, wherein the fine position information in conjunction with said clock information and said measured eccentricity of the printed reference pattern can be used to precisely position and maintain the data transducers concentric data tracks.

27. The reference pattern of claim 19, wherein the slanted segments between each pair of adjacent timing segments are organized into at least two circumferentially adjacent sets of transverse slanted segments.

28. The reference pattern of claim 27, wherein the slanted segments between each pair of adjacent timing segments include periodically suppressed slanted segments and wherein the coarse position information comprises the periodically suppressed slanted segments, and the fine position information comprises the unsuppressed slanted segments.

29. The reference pattern of claim 28, wherein the slanted segments are radially spaced.

30. A method for self-servo writing a disk drive comprising the steps of:
   (a) transferring a servo reference pattern by magnetic printing onto at least one storage surface of a disk, wherein a resulting printed reference pattern comprises:
      (1) servo clock information providing transducer head circumferential relative position information, and
      (2) servo position information including coarse position information for providing transducer head coarse radial relative position information, and fine position information for providing transducer head fine radial relative position information;
         wherein the printed reference pattern has a resolution lower than a disk drive servo pattern including features proportional to head gap widths of data transducer heads included in the disk drive;
   (b) assembling the disk drive including the steps of installing the disk into the disk drive and enclosing the disk and the data transducers within a housing sealed against particulate contamination from an external ambient environment;
   (c) reading the printed reference pattern from the disk via a transducer head;
   (d) using the coarse position information to measure an eccentricity of the printed reference pattern, and using the measured eccentricity and the read servo clock and the servo position information to precisely position the data transducers at concentric track locations of disk storage surfaces; and
   (e) self-writing disk drive servo patterns onto the storage surfaces at the concentric track locations with the data transducers in accordance with the disk drive servo pattern features.

31. The method of claim 30, wherein the step of measuring eccentricity further includes the steps of using the fine and the coarse position information to measure the eccentricity of the printed reference pattern.

32. The method of claim 31, wherein step (d) further comprises the steps of using at least the fine position information in conjunction with said clock information and said measured eccentricity of the printed reference pattern to precisely position the data transducers at concentric data tracks.

33. A method for self-servo writing a disk drive with the aid of a printed reference pattern transferred by magnetic printing onto a storage surface of a first disk, wherein the printed reference pattern includes: (i) servo clock information providing transducer head circumferential relative position information and (ii) servo position information including coarse position information for providing transducer head coarse radial relative position information and fine position information for providing transducer head fine radial relative position information, and wherein reference pattern features have a resolution lower than disk drive servo pattern features proportional to head gap widths of data transducer heads included in the disk drive, the method comprising the steps of:
- (a) assembling the disk drive including the steps of installing the first disk and transducers into a housing of the disk drive and enclosing the housing to prevent particulate contamination;
- (b) reading the printed reference pattern from the first disk via one or more transducers;
- (c) using the coarse servo position information and the fine servo position information to measure an eccentricity of the printed reference pattern; and using servo clock and position information in conjunction with said clock information and said measured eccentricity of the printed reference pattern to precisely position the transducer heads at concentric data tracks on at least one disk storage surface; and
- (d) self-writing disk drive servo patterns onto the storage surface at the concentric track locations via the transducer heads in accordance with the disk drive servo pattern features.

34. A method for self-servo writing a disk drive with the aid of a printed reference pattern transferred by magnetic printing onto a storage surface of a first disk, wherein the printed reference pattern includes: (i) servo clock information providing transducer head circumferential relative position information and (ii) servo position information including coarse position information for providing transducer head coarse radial relative position information and fine position information for providing transducer head fine radial relative position information, the clock information comprising substantially radial segments, the fine position information comprising a fine pattern of slanted segments, the coarse position information comprising a coarse pattern of slanted segments, the coarse pattern of slanted segments being interspersed with the fine pattern of slanted segments, and sets of one or more timing segments are separated by said interspersed coarse and fine patterns of slanted segments, and wherein reference pattern features have a resolution lower than disk drive servo pattern features proportional to head gap widths of data transducer heads included in the disk drive, the method comprising the steps of:
- (a) assembling the disk drive including the steps of installing the first disk and transducers into a housing of the disk drive and enclosing the housing to prevent particulate contamination;
- (b) reading the printed reference pattern from the first disk via one or more transducers;
- (c) using the servo clock and servo position information to precisely position transducer heads at concentric data track storage locations on at least one disk storage surface; and
- (d) self-writing disk drive servo patterns onto one or more storage surfaces at the concentric track locations via the transducer heads in accordance with the disk drive servo pattern features.

35. An embedded reference pattern for use in self-servo writing a disk drive including one or more transducer heads, a first disk and one or more rotating disk media, wherein the reference pattern is transferred by magnetic printing onto a storage surface of the first disk resulting in a printed reference pattern, the reference pattern comprising:
- (a) servo clock information providing transducer head circumferential relative position information, and
- (b) servo position information including coarse position information for providing transducer head coarse radial relative position information, and fine position information for providing transducer head fine radial relative position information, wherein the servo position information comprises a multi-frequency periodic pattern having periodically suppressed cycles, and wherein the coarse position information comprises the periodically suppressed cycles, and the fine position information comprises the unsuppressed cycles;
  - wherein the reference pattern has a resolution lower than a disk drive servo pattern features proportional to head gap widths of data transducer heads included in the disk drive;
  - such that, during a self-servo writing operation, the printed reference pattern can be read via one of the transducer heads, and the servo clock and the servo position information used to precisely position the data transducers at concentric track locations of disk storage surfaces to enable self-writing disk drive servo patterns onto the storage surfaces at the concentric track locations with the transducers in accordance with the disk drive servo pattern features.

36. A method for self-servo writing a disk drive comprising the steps of:
- (a) transferring a servo reference pattern by magnetic printing onto at least one storage surface of a disk, wherein a resulting printed reference pattern comprises:
  - (1) servo clock information providing transducer head circumferential relative position information, and
  - (2) servo position information including coarse position information for providing transducer head coarse radial relative position information, and fine position information for providing transducer head fine radial relative position information;
    - said servo clock information comprising a pattern of one or more substantially radial timing segments, and said servo position information comprising slanted segments, such that sets of one or more timing segments are separated by the slanted segments;
    - wherein the slanted segments between the timing segments include periodically suppressed slanted segments, wherein the coarse position information comprises the periodically suppressed slanted segments and the fine position information comprises the unsuppressed slanted segments, and wherein the printed reference pattern has a resolution lower than a disk drive servo pattern including features proportional to head gap widths of data transducer heads included in the disk drive;
- (b) assembling the disk drive including the steps of installing the disk into the disk drive and enclosing the disk and the data transducers within a housing sealed against particulate contamination from an external ambient environment;
- (c) reading the printed reference pattern from the disk via a transducer head;
- (d) using the read servo clock and the servo position information to precisely position the data transducers at concentric track locations of disk storage surfaces; and
- (e) self-writing disk drive servo patterns onto the storage surfaces at the concentric track locations with the data transducers in accordance with the disk drive servo pattern features.

37. The method of claim 36, wherein the slanted segments are substantially radially spaced.

38. A method for self-servo writing a disk drive comprising the steps of:
   (a) transferring a servo reference pattern by magnetic printing onto at least one storage surface of a disk, wherein a resulting printed reference pattern comprises:
      (1) servo clock information providing transducer head circumferential relative position information, and
      (2) servo position information including coarse position information for providing transducer head coarse radial relative position information, and fine position information for providing transducer head fine radial relative position information;
         said servo clock information comprising a pattern of one or more substantially radial timing segments, and said servo position information comprising slanted segments, such that sets of one or more timing segments are separated by the slanted segments;
         wherein the servo position information comprises a multi-frequency periodic pattern having periodically suppressed cycles, wherein the coarse position information comprises the periodically suppressed cycles and the fine position information comprises the unsuppressed cycles, and wherein the printed reference pattern has a resolution lower than a disk drive servo pattern including features proportional to head gap widths of data transducer heads included in the disk drive;
   (b) assembling the disk drive including the steps of installing the disk into the disk drive and enclosing the disk and the data transducers within a housing sealed against particulate contamination from an external ambient environment;
   (c) reading the printed reference pattern from the disk via a transducer head;
   (d) using the read servo clock and the servo position information to precisely position the data transducers at concentric track locations of disk storage surfaces; and
   (e) self-writing disk drive servo patterns onto the storage surfaces at the concentric track locations with the data transducers in accordance with the disk drive servo pattern features.

39. A method for self-servo writing a disk drive comprising the steps of:
   (a) transferring a servo reference pattern by magnetic printing onto at least one storage surface of a disk, wherein a resulting printed reference pattern comprises:
      (1) servo clock information providing transducer head circumferential relative position information, and
      (2) servo position information including coarse position information for providing transducer head coarse radial relative position information, and fine position information for providing transducer head fine radial relative position information;
         said servo clock information comprising a pattern of one or more substantially radial timing segments, and said servo position information comprising slanted segments, such that sets of one or more timing segments are separated by the slanted segments;
         wherein: (i) the fine position information comprises a fine pattern of slanted segments, (ii) the coarse position information comprises a coarse pattern of slanted segments, the coarse pattern of slanted segments being interspersed with the fine pattern of slanted segments, and (iii) sets of one or more timing segments are separated by said interspersed coarse and fine patterns of slanted segments; and
         wherein the printed reference pattern has a resolution lower than a disk drive servo pattern including features proportional to head gap widths of data transducer heads included in the disk drive;
   (b) assembling the disk drive including the steps of installing the disk into the disk drive and enclosing the disk and the data transducers within a housing sealed against particulate contamination from an external ambient environment;
   (c) reading the printed reference pattern from the disk via a transducer head;
   (d) using the read servo clock and the servo position information to precisely position the data transducers at concentric track locations of disk storage surfaces; and
   (e) self-writing disk drive servo patterns onto the storage surfaces at the concentric track locations with the data transducers in accordance with the disk drive servo pattern features.

40. The method of claim 39, wherein the slanted segments of said fine pattern are radially finely spaced relative to one another.

41. The method of claim 39, wherein the slanted segments of said course pattern are radially coarsely spaced relative to one another.

42. A method for self-servo writing a disk drive comprising the steps of:
   (a) transferring a servo reference pattern by magnetic printing onto at least one storage surface of a disk, wherein a resulting printed reference pattern comprises:
      (1) servo clock information providing transducer head circumferential relative position information, and
      (2) servo position information including coarse position information for providing transducer head coarse radial relative position information, and fine position information for providing transducer head fine radial relative position information;
         said servo clock information comprising a pattern of one or more substantially radial timing segments, and said servo position information comprising slanted segments, such that sets of one or more timing segments are separated by the slanted segments;
         wherein the slanted segments between the timing segments are organized into at least two circumferentially adjacent sets of transverse slanted segments and wherein the printed reference pattern has a resolution lower than a disk drive servo pattern including features proportional to head gap widths of data transducer heads included in the disk drive;
   (b) assembling the disk drive including the steps of installing the disk into the disk drive and enclosing the disk and the data transducers within a housing sealed against particulate contamination from an external ambient environment;
   (c) reading the printed reference pattern from the disk via a transducer head;

(d) using the read servo clock and the servo position information to precisely position the data transducers at concentric track locations of disk storage surfaces; and (e) self-writing disk drive servo patterns onto the storage surfaces at the concentric track locations with the data transducers in accordance with the disk drive servo pattern features.

43. The method of claim 42, wherein the slanted segments between timing segments include periodically suppressed slanted segments and wherein the coarse position information comprises the periodically suppressed slanted segments, and the fine position information comprises the unsuppressed slanted segments.

44. The method of claim 43, wherein the fine position information comprises the unsuppressed slanted segments forming a fine pattern of radially spaced unsuppressed slanted segments.

45. The method of claim 43, wherein the coarse position information comprises the suppressed slanted segments forming a coarse pattern of radially spaced suppressed slanted segments.

46. The method of claim 43, wherein: (i) the fine position information comprises a fine pattern of unsuppressed slanted segments, (ii) the coarse position information comprises a coarse pattern of suppressed slanted segments, the coarse pattern being interspersed with the fine pattern, and (iii) sets of one or more timing segments are separated by said interspersed coarse and fine patterns.

47. An embedded reference pattern for use in self-servo writing a disk drive including one or more transducer heads, a first disk and one or more rotating disk media, wherein the reference pattern is transferred by magnetic printing onto a storage surface of the first disk resulting in a printed reference pattern, the reference pattern comprising:

(a) servo clock information providing transducer head circumferential relative position information, and (b) servo position information including coarse position information for providing transducer head coarse radial relative position information, and fine position information for providing transducer head fine radial relative position information;

said servo clock information comprising substantially radial timing segments, and said servo position information comprising slanted segments, such that sets of one or more timing segments are separated by the slanted segments;

wherein the slanted segments between each pair of adjacent timing segments include periodically suppressed slanted segments, wherein the coarse position information comprises the periodically suppressed slanted segments and the fine position information comprises the unsuppressed slanted segments, and wherein the reference pattern has a resolution lower than disk drive servo pattern features proportional to head gap widths of data transducer heads included in the disk drive;

such that, during a self-servo writing operation, the printed reference pattern is read via the one or more transducer heads, and the servo clock and the servo position information is used to precisely position the one or more data transducers at concentric track locations of disk storage surfaces to enable self-writing of disk drive servo patterns onto the storage surfaces at the concentric track locations with the one or more transducers in accordance with the disk drive servo pattern features.

48. The reference pattern of claim 47, wherein adjacent slanted segments are substantially radially spaced.

49. An embedded reference pattern for use in self-servo writing a disk drive including one or more transducer heads, a first disk and one or more rotating disk media, wherein the reference pattern is transferred by magnetic printing onto a storage surface of the first disk resulting in a printed reference pattern, the reference pattern comprising:

(a) servo clock information providing transducer head circumferential relative position information, and (b) servo position information including coarse position information for providing transducer head coarse radial relative position information, and fine position information for providing transducer head fine radial relative position information;

said servo clock information comprising substantially radial timing segments, and said servo position information comprising slanted segments, such that sets of one or more timing segments are separated by the slanted segments;

wherein the fine position information comprises a fine pattern of slanted segments, wherein the coarse position information includes a coarse pattern of slanted segments, wherein the coarse pattern of slanted segments is interspersed with the fine pattern of slanted segments, and wherein the timing segments are separated by the servo position information;

wherein the reference pattern has a resolution lower than disk drive servo pattern features proportional to head gap widths of data transducer heads included in the disk drive;

such that, during a self-servo writing operation, the printed reference pattern is read via the one or more transducer heads, and the servo clock and the servo position information is used to precisely position the one or more data transducers at concentric track locations of disk storage surfaces to enable self-writing of disk drive servo patterns onto the storage surfaces at the concentric track locations with the one or more transducers in accordance with the disk drive servo pattern features.

50. The reference pattern of claim 49, wherein the slanted segments of said fine pattern are radially finely spaced relative to one another.

51. The reference pattern of claim 49, wherein the slanted segments of said coarse pattern are radially coarsely spaced relative to one another.

52. An embedded reference pattern for use in self-servo writing a disk drive including one or more transducer heads, a first disk and one or more rotating disk media, wherein the reference pattern is transferred by magnetic printing onto a storage surface of the first disk resulting in a printed reference pattern, the reference pattern comprising:

(a) servo clock information providing transducer head circumferential relative position information, and (b) servo position information including coarse position information for providing transducer head coarse radial relative position information, and fine position information for providing transducer head fine radial relative position information;

said servo clock information comprising substantially radial timing segments, and said servo position information comprising slanted segments, such that sets of one or more timing segments are separated by the slanted segments;

wherein the slanted segments between each pair of adjacent timing segments are organized into at least two circumferentially adjacent sets of transverse slanted segments and wherein the reference pattern has a resolution lower than disk drive servo pattern features proportional to head gap widths of data transducer heads included in the disk drive;

such that, during a self-servo writing operation, the printed reference pattern is read via the one or more transducer heads, and the servo clock and the servo position information is used to precisely position the one or more data transducers at concentric track locations of disk storage surfaces to enable self-writing of disk drive servo patterns onto the storage surfaces at the concentric track locations with the one or more transducers in accordance with the disk drive servo pattern features.

53. The reference pattern of claim 52, wherein the slanted segments between each pair of adjacent timing segments include periodically suppressed slanted segments and wherein the coarse position information comprises the periodically suppressed slanted segments, and the fine position information comprises the unsuppressed slanted segments.

54. The reference pattern of claim 53, wherein the slanted segments are radially spaced.

* * * * *